United States Patent
Son et al.

(10) Patent No.: US 9,846,570 B2
(45) Date of Patent: Dec. 19, 2017

(54) MULTI-MODULE COMPILATION SYSTEM, MULTI-MODULE COMPILATION METHOD, AND NON-TRANSITORY COMPUTER-READABLE STORAGE MEDIUM

(71) Applicant: LUXROBO, Seoul (KR)

(72) Inventors: Seung Bae Son, Seoul (KR); Sang Hun Oh, Seoul (KR); Goo Beom Jeoung, Suwon-si, Gyeonggi-do (KR)

(73) Assignee: Luxrobo, Yongsan-Gu, Seoul (KR)

( * ) Notice: Subject to any disclaimer, the term of this patent is extended or adjusted under 35 U.S.C. 154(b) by 0 days.

(21) Appl. No.: 15/270,069

(22) Filed: Sep. 20, 2016

(65) Prior Publication Data
US 2017/0255451 A1    Sep. 7, 2017

Related U.S. Application Data

(63) Continuation of application No. 15/146,252, filed on May 4, 2016, now Pat. No. 9,524,148.

(30) Foreign Application Priority Data

Mar. 7, 2016    (KR) .................. 10-2016-0027222

(51) Int. Cl.
*G06F 9/44* (2006.01)
*G06F 3/0484* (2013.01)
(Continued)

(52) U.S. Cl.
CPC ............ *G06F 8/315* (2013.01); *G06F 3/0484* (2013.01); *G06F 8/34* (2013.01); *G06F 8/447* (2013.01);
(Continued)

(58) Field of Classification Search
CPC ....................................................... G06F 8/315
(Continued)

(56) References Cited

U.S. PATENT DOCUMENTS

| 5,613,117 A | 3/1997 | Davidson et al. |
|---|---|---|
| 5,787,284 A | 7/1998 | Blainey et al. |

(Continued)

FOREIGN PATENT DOCUMENTS

| EP | 1026587 A2 | 8/2000 |
|---|---|---|
| JP | 09171405 | 6/1997 |
| KR | 1020090110486 | 10/2009 |

OTHER PUBLICATIONS

Debray et al, "Compiler Techniques for Code Compaction", ACM Transactions on Programming Languages and Systems, vol. 22, No. 2, pp. 378-415, 2000.*

(Continued)

*Primary Examiner* — Anil Khatri
(74) *Attorney, Agent, or Firm* — Dinsmore & Shohl LLP

(57) ABSTRACT

Provided is a multi-module compilation system for generating execution codes for each of modules in a module system. The multi-module compilation system may include a module identifier configured to analyze a program code of the module system and to identify target modules that execute the program code, a module code generator configured to divide the program code into module codes for each of the target modules and to generate the module codes, and a compiler configured to compile the module codes and to generate execution codes for each of the target modules.

17 Claims, 20 Drawing Sheets

(51) Int. Cl.
*G06F 9/45* (2006.01)
*G06F 9/445* (2006.01)
*G06F 17/24* (2006.01)

(52) U.S. Cl.
CPC .............. *G06F 8/451* (2013.01); *G06F 8/665* (2013.01); *G06F 17/24* (2013.01)

(58) Field of Classification Search
USPC ................. 717/101–108, 140–141, 120–122
See application file for complete search history.

(56) References Cited

U.S. PATENT DOCUMENTS

| | | | | |
|---|---|---|---|---|
| 5,974,256 | A * | 10/1999 | Matthews | G06F 8/41 717/118 |
| 6,031,993 | A | 2/2000 | Andrews et al. | |
| 6,064,819 | A | 5/2000 | Franssen et al. | |
| 6,175,948 | B1 | 1/2001 | Miller et al. | |
| 6,237,135 | B1 * | 5/2001 | Timbol | G06F 8/34 717/107 |
| 6,269,473 | B1 * | 7/2001 | Freed | G06F 8/20 703/22 |
| 6,601,233 | B1 * | 7/2003 | Underwood | G06F 8/24 717/100 |
| 6,601,234 | B1 * | 7/2003 | Bowman-Amuah | G06F 8/24 705/7.37 |
| 6,701,513 | B1 * | 3/2004 | Bailey | G06F 8/34 715/967 |
| 6,922,824 | B2 * | 7/2005 | Swetland | G06F 8/443 717/107 |
| 7,359,820 | B1 * | 4/2008 | Browne | G06F 11/3688 702/108 |
| 7,493,594 | B2 * | 2/2009 | Shenfield | G06F 8/10 717/102 |
| 7,581,205 | B1 * | 8/2009 | Massoudi | G06F 8/34 717/106 |
| 7,627,680 | B2 | 12/2009 | Hutcheson et al. | |
| 7,703,073 | B2 * | 4/2010 | Illowsky | G06F 1/3203 717/103 |
| 7,853,933 | B2 * | 12/2010 | Coker | G06F 8/36 717/114 |
| 7,895,566 | B2 * | 2/2011 | Shenfield | G06F 8/20 717/106 |
| 7,996,814 | B1 * | 8/2011 | Qureshi | G06N 5/048 717/100 |
| 8,271,941 | B2 * | 9/2012 | Zhang | G06Q 10/00 717/107 |
| 8,473,898 | B2 * | 6/2013 | Pandey | G06F 8/20 717/104 |
| 8,621,448 | B2 | 12/2013 | Gonion | |
| 8,789,026 | B2 * | 7/2014 | Auerbach | G06F 8/456 717/120 |
| 8,813,032 | B2 * | 8/2014 | Graf | G06F 8/34 707/617 |
| 8,850,574 | B1 * | 9/2014 | Ansel | G06F 21/53 717/107 |
| 8,863,101 | B2 * | 10/2014 | Gellerich | G06F 8/37 717/141 |
| 8,875,112 | B2 | 10/2014 | Graunke | |
| 8,910,113 | B2 * | 12/2014 | Srinivasaraghavan | G06F 8/34 717/106 |
| 8,910,131 | B2 * | 12/2014 | Moosmann | G05B 19/042 700/79 |
| 8,972,931 | B1 * | 3/2015 | Pillarisetti | G06F 8/10 703/22 |
| 9,032,328 | B1 * | 5/2015 | Kilat | G06F 8/315 715/744 |
| 9,557,967 | B1 * | 1/2017 | Clarke | G06F 8/33 |

OTHER PUBLICATIONS

Ozturk et al, "MultiCompilation: Capturing Interactions Among ConcurrentlyExecuting Applications", ACM, pp. 157-163, 2006.*
Joshi et al, "Denali: A Practical Algorithm for Generating Optimal Code", ACM Transactions on Programming Languages and Systems, vol. 28, No. 6, pp. 967-989, 2006.*
Leupers et al, "Algorithms for Address Assignment in DSP Code Generation", IEEE, pp. 1-4, 1996.*
Nazari et al, "Management of Guided and Unguided Code Generator Customizations by Using a Symbol Table", ACM, pp. 37-42, 2015.*
Kastner et al, "A Variability-Aware Module System", ACM, pp. 773-791, 2012.*
Li et al, "Lightweight Feedback-Directed Cross-Module Optimization", ACM, pp. 53-61, 2010.*
"Secure Compilation to Protected Module Architectures" Patrignani, et al., ACM Transactions on Programming Languages and Systems, vol. 37, No. 2, Article 6, pp. 1-50 Publication Date: Apr. 2015.
"Partial Evaluation and Separate Compilation" Heldal, et al. ACM, pp. 1-11 Publication Date: 1997.
Non-Final Office Action dated Aug. 26, 2016 for U.S. Appl. No. 15/146,252, filed May 4, 2016.
European Patent Office, European Search Report issued in EP Application No. 16199123 dated May 9, 2017, 11 pages.
Mirko Bordignon et al., "A Virtual Machine-based Approach for Fast and Flexible Reprogramming of Modular Robots", 2009 IEEE International Conference on Robotics and Automation, Kobe, Japan, May 12-17, 2009, pp. 4273-4280.
Andrea Bonarini et al., "R2P: an Open Source Modular Architecture for Rapid Prototyping of Robotics Applications", Proceedings of the 1st IFAC Conference on Embedded Systems, Computational Intelligence and Telematics in Control—CESCIT 2012, Wurzburg, Germany, Apr. 3-5, 2012, pp. 68-73.
Stephane Magnenat et al., "ASEBA: A Modular Architecture for Event-Based Control of Complex Robots", IEEE/ASME Transactions on Mechatronics, vol. 16, No. 2, Apr. 2011, pp. 321-329.

* cited by examiner

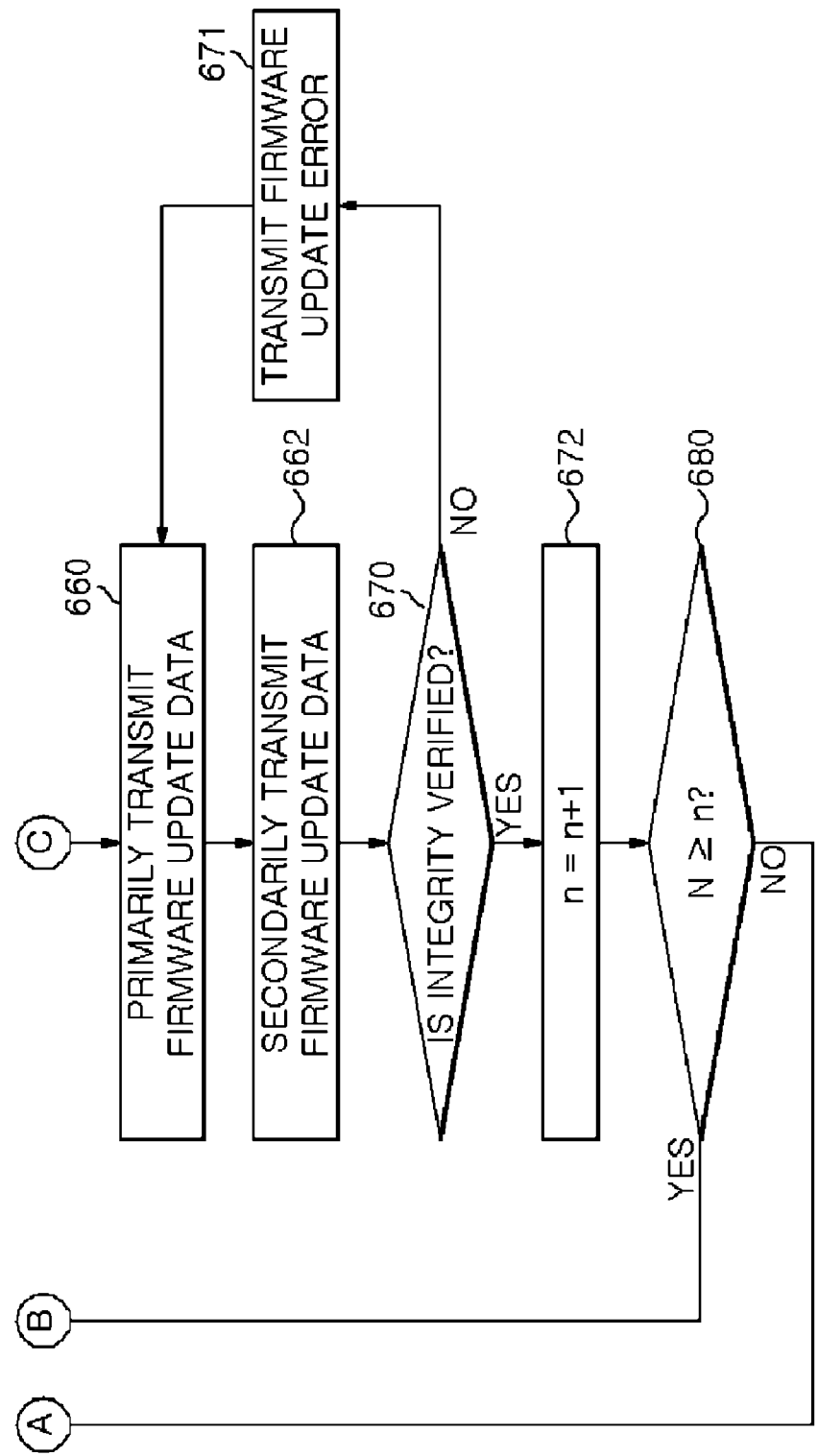

FIG.12A
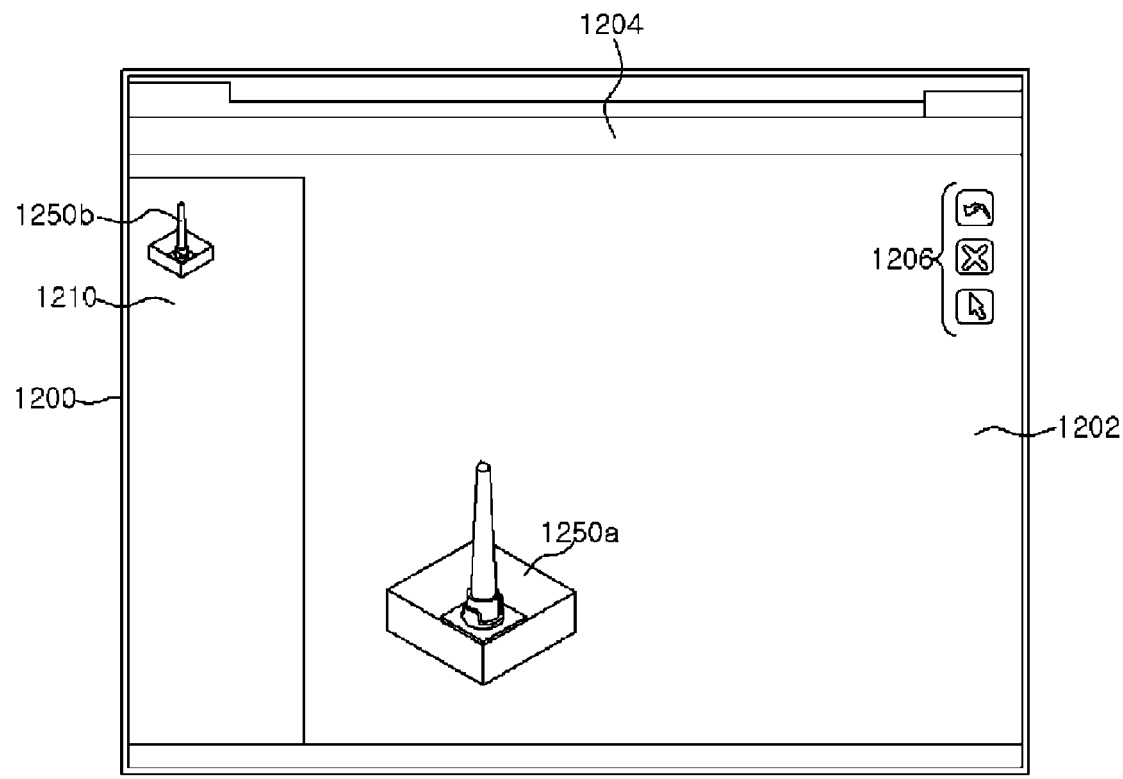
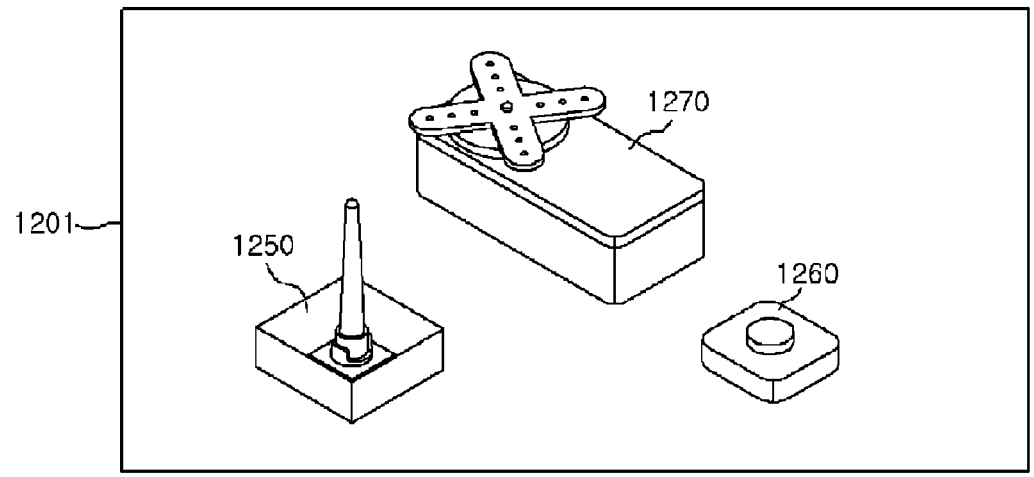

FIG. 16A

```
namespace Base
{
    public partial class CommunicationModule : Form
    {
        public CommunicationModule()
        {
            InitializeComponent();
        }
    }
}
```

1600
1622 → public partial class CommunicationModule : Form

FIG. 16B

```
namespace Base
{
    public partial class CommunicationModule : Form
    {
        public CommunicationModule()
        {
            InitializeComponent();
            this.button1.Click += new System.EventHandler (this.button1_Click);
            this.ServoMoter1.Location = Point(0);
        } private void button1_Click(object sender , EventArgs e)
        {
            // WRITE CONTENT OF EVENT TO OCCUR IF BUTTON IS PRESSED
        }
    }
}
```

1620
1602 → public partial class CommunicationModule : Form
1622 → InitializeComponent();
1624 → this.ServoMoter1.Location = Point(0);
1626 → // WRITE CONTENT OF EVENT TO OCCUR IF BUTTON IS PRESSED

FIG. 17A

```
Int main(void){
  GPIO_InitTypeDef GPIO_InitStructure;
  // SET BASIC OPERATION OF MCU
  Common_Init();
  RCC_ClocksTypeDef Rcc_ClocksStatus;
  RCC_GetClocksFreq(&RCC_ClocksStatus);

// BASIC SETTING OF HARDWARE PIN WITH SWITCH BUTTON
  RCC_ClockSecuritySystemCmd(ENABLE);
  RCC_APB2PeriphClockCmd(RCC_APB2periph_GPIOB,
ENABLE);

GPIO_InitStructure.GPIO_Pin = GPIO_pin_0;
  GPIO_InitStructure.GPIO_Mode = GPIO_mode_AF_PP;
  GPIO_InitStructure.GPIO_Speed = GPIO_Speed_50MHz;
  GPIO_Init(GPIOB, &GPIO_InitStructure);

GPIO_PinRemapConfig(GPIO_PartialRemap_TIM1, ENABLE);

Event1Message.Data[0] = 1;
  Event1Message.Data[1] = TURE;
  Event1Message.DLC = 2;
  Event1Message.ExtId = 0x02; // MAC ID OF MODULE TO OPERATE while(1){
    if(GPIO_ReadInputDataBit(GPIOB, GPIO_Pin_0) == SET){
      CAN_Transmit(CAN1, &Event1Message);
    }
  }
}
```

FIG. 17B

```
Int main(void){
 GPIO_InitTypeDef GPIO_InitStructure;
 TIM_TimeBaseInitTypeDef TIM_TimeBaseInitStruct;
 TIM_OCInitTypeDef TIM_OCInitStruct;
 TIM_BDTRInitTypeDef TIM_BDTRInitStruct;
 NVIC_InitTypeDef NVIC_InitStructure;

// SET BASIC OPERATION OF MCU                         ─1762
 Common_Init();
 RCC_ClocksTypeDef RCC_ClocksStatus;
 RCC_GetClocksFreq(&RCC_ClocksStatus);

// BASIC SETTING OF HARDWARE PIN WITH SWITCH BUTTON
 RCC_ClockSecuritySystemCmd(ENABLE);
 RCC_APB2PeriphClockCmd(RCC_APB2periph_GPIOB, ENABLE);

/* TIM1 base configuration */
 TIM_TimeBaseInitStruct.TIM Prescaler = 3-1;
 TIM_TimeBaseInitStruct.TIM Period = 1000-1;
 // OMITTED
1765─── SERVO_Position(0);

1766─── RxFilterMessage = 0x02;                         ─1764 while(1){
  if(CAN_GetFlagStatus(CAN1, CAN_FLAG_FMP0) == SET ){
   CAN_Receive(CAN1, CAN_FIFO0, &RxMessage);
1768───  if(RxMessage.Data[0] == 1 && RxMessage.Data[1] ==
  TURE ){
1769───   SERVO_Position(180);
   }
  }
 }
}
```

MULTI-MODULE COMPILATION SYSTEM, MULTI-MODULE COMPILATION METHOD, AND NON-TRANSITORY COMPUTER-READABLE STORAGE MEDIUM

CROSS-REFERENCE TO RELATED APPLICATION(S)

This application is a continuation of U.S. patent application Ser. No. 15/146,340, which claims priority to Korean Patent Application No. 10-2016-0027222 filed on Mar. 7, 2016, the entire contents of which are hereby incorporated by reference.

BACKGROUND

1. Field

One or more example embodiments relate to a multi-module compilation system, a multi-module compilation method, and a non-transitory computer-readable storage medium.

2. Description of Related Art

Recently, various module-based systems have been suggested for the purpose of education, hobbies, research, or production. Modules included in such module-based systems may each perform a specific function, and be connected to another to form a module assembly. The modules may be electrically connected to one another to exchange energy, signals, or data. A user may manufacture a module system to achieve a specific purpose by assembling modules according to a provided manual or in a creative manner.

The above module system according to a related art needs to individually update a program to operate the module system for each module, to change a purpose of use or to upgrade to a better version. To this end, modules included in the module system need to be separated as individual units, and a task for updating is required for each of the separated modules, which may cause great inconvenience physically and a considerable amount of time.

Also, it is impossible to develop programs for an operation of the entire module system according to the related art all at once, and programs need to be developed and compiled individually for each module. Accordingly, it is difficult to perform development.

SUMMARY

An aspect provides a module system and an update method for the module system that may update data of each of a plurality of modules included in the module system.

Another aspect also provides a multi-module compilation system and a multi-module compilation method that may generate, from a program code for an entire module system, execution codes for each of a plurality of modules that are included in the module system and that are connected to a network.

According to an aspect, there is provided a multi-module compilation system for generating execution codes for each of a plurality of modules included in a module system, the multi-module compilation system including a module identifier configured to analyze a program code of the module system and to identify target modules that execute the program code, a module code generator configured to divide the program code into module codes for each of the target modules and to generate the module codes, and a compiler configured to compile the module codes and to generate execution codes for each of the target modules.

The module code generator may be configured to divide the program code into the module codes for each of the target modules and to generate the module codes based on a correlation between the target modules and events occurring in the target modules.

The multi-module compilation system may further include a user interface (UI) configured to allow a user to generate and edit the program code of the module system.

The module codes may each include a module setting portion including content for setting a module and identifier information of the module, an event transmission and reception portion including content of a message transmitted and received between modules, and an event operation portion including content about an operation of the module in response to the message.

The multi-module compilation system may further include a communicator configured to communicate with the module system.

The multi-module compilation system may further include a module recognizer configured to automatically recognize a type and a number of modules included in the module system when the communicator and the module system are communicably connected to each other.

The module recognizer may be configured to receive an execution code stored in each of the modules in the module system.

The multi-module compilation system may further include a UI configured to allow a user to generate and edit the program code of the module system. The UI may be configured to display an image of a module recognized by the module recognizer.

The multi-module compilation system may further include a code database (DB) configured to store the program code or the module codes.

At least a portion of the program code may be programmed using an application programming interface (API).

The plurality of modules may be connected to a network.

According to another aspect, there is provided a multi-module compilation method performed by a computer or a mobile device to generate execution codes for each of a plurality of modules included in a module system, the multi-module compilation method including analyzing a program code of the module system and identifying target modules that execute the program code, dividing the program code into module codes for each of the target modules and generating the module codes, and compiling the module codes and generating execution codes for each of the target modules.

The dividing may include dividing the program code into the module codes for each of the target modules and generating the module codes based on a correlation between the target modules and events occurring in the target modules.

The multi-module compilation method may further include transmitting each of the generated execution codes to each of the target modules in the module system.

The multi-module compilation method may further include automatically recognizing a type and a number of modules included in the module system when the module system is communicably connected to the computer or the mobile device.

The multi-module compilation method may further include displaying the recognized type and the recognized number of the modules on the computer or the mobile device.

According to another aspect, there is provided a non-transitory computer-readable storage medium storing a compiler program for generating execution codes for each of a plurality of modules included in a module system. When the compiler program is executed by a computer or a mobile device, the non-transitory computer-readable storage medium may perform a method including analyzing a program code of the module system and identifying target modules that execute the program code, dividing the program code into module codes for each of the target modules and generating the module codes, and compiling the module codes and generating execution codes for each of the target modules.

The dividing may include dividing the program code into the module codes for each of the target modules and generating the module codes based on a correlation between the target modules and events occurring in the target modules.

The method may further include providing a UI configured to allow a user to generate and edit the program code of the module system. The UI may be a character user interface (CUI) or a graphical user interface (GUI).

Additional aspects of example embodiments will be set forth in part in the description which follows and, in part, will be apparent from the description, or may be learned by practice of the disclosure.

In a module system and an update method for the module system according to an example embodiment, data of a plurality of modules included in the module system may be updated all at once instead of individually, and thus it is possible to perform updating for the modules simply and efficiently in time.

In a multi-module compilation system and a multi-module compilation method according to an example embodiment, execution codes for each of a plurality of modules included in a module system may be quickly and effectively generated from a program code for the entire module system. Thus, it is possible to simply and efficiently update each of the modules by generating codes for each of the modules from the program code and compiling the codes.

BRIEF DESCRIPTION OF THE DRAWINGS

These and/or other aspects, features, and advantages of the disclosure will become apparent and more readily appreciated from the following description of example embodiments, taken in conjunction with the accompanying drawings of which:

FIG. 6B is a flowchart illustrating operations of a master module to perform updating for each of modules in a module system according to an example embodiment;

FIG. 12A is a diagram provided to explain a graphical user interface (GUI) in a multi-module compilation system according to an example embodiment;

FIG. 16A illustrates a code list showing a class of a module in a program code compiled in a multi-module compilation system according to an example embodiment;

FIG. 16B illustrates a code list showing a class of another module that is additionally recognized according to an example embodiment;

FIG. 17A illustrates code lists for each module generated using a multi-module compilation system according to an example embodiment.

FIG. 17B illustrates code lists for each module generated using a multi-module compilation system according to an example embodiment.

DETAILED DESCRIPTION

Figure 1:
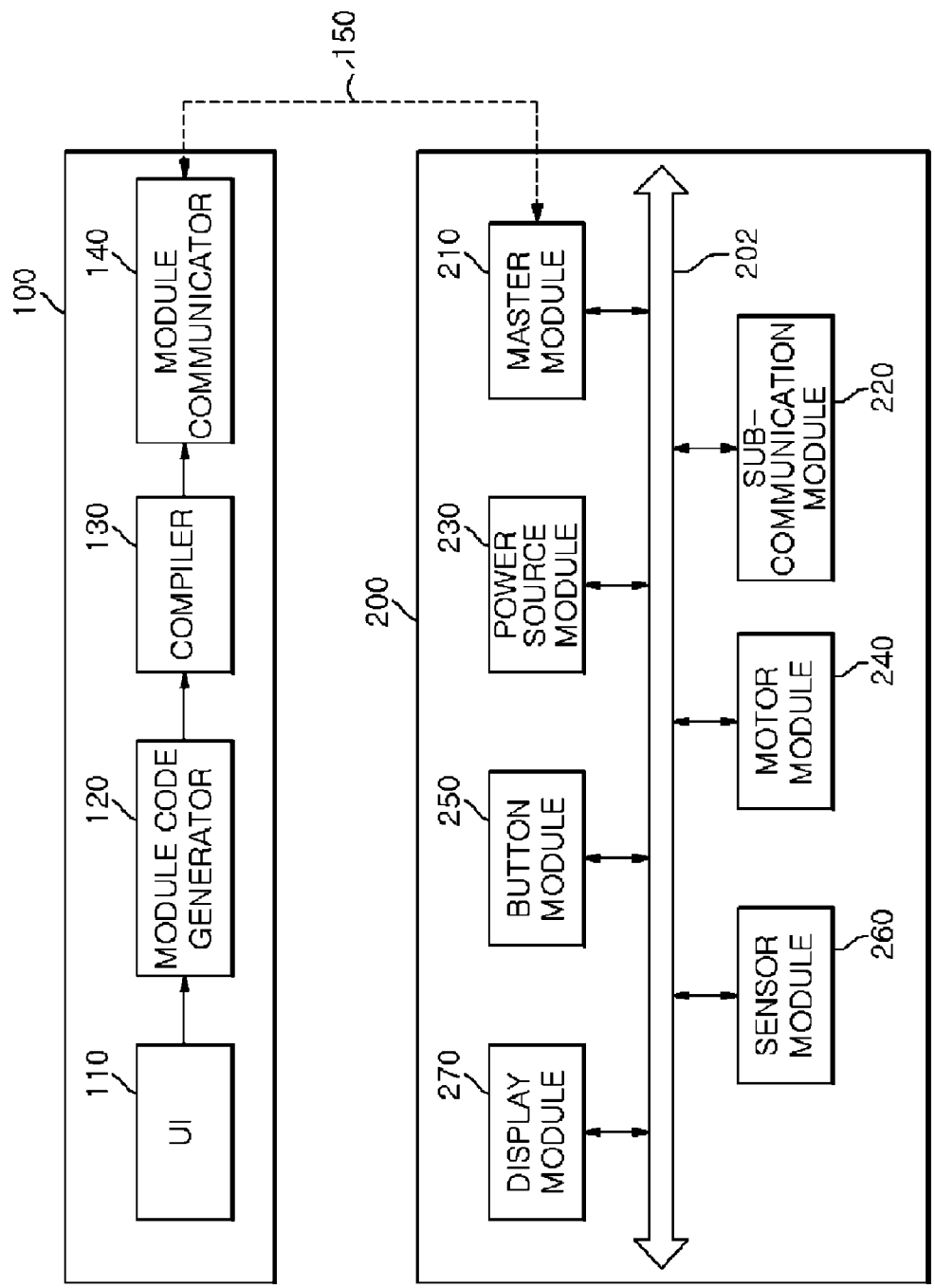
FIG. 1 is a block diagram illustrating a configuration of a module system according to an example embodiment.

Hereinafter, example embodiments will be described in detail with reference to the accompanying drawings so that inventive concept may be readily implemented by one of ordinary skill in the art. Example embodiments may, however, be embodied in many different forms and should not be construed as being limited to the embodiments set forth herein. In the drawings, certain parts not directly relevant to the description are omitted to enhance the clarity of the drawings.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise.

It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Also, the following example embodiments are provided so that this disclosure will be thorough and complete, and will fully convey the concept of the disclosure to one of ordinary skill in the art. In the drawings, shapes and sizes of elements may be exaggerated for clarity.

Hereinafter, example embodiments will be described in detail with reference to the accompanying drawings.

Module System

FIG. 1 is a block diagram illustrating a configuration of a module system according to an example embodiment.

Referring to FIG. 1, a module system 200 according to an example embodiment includes a plurality of modules, for example, modules 210, 220, 230, 240, 250, 260 and 270 that may communicate with each other. The module system 200 may update the modules 210 through 270 all at once.

In example embodiments, the term "module" refers to a functional unit to perform a specific function of a module. The "modules" may be connected over a network to communicate with each other, and may be physically separated from each other or disposed in the same physical space.

In example embodiments, the terms "master" and "sub" are used to distinguish various modules from each other in describing the modules, and thus should not be construed as indicating a functional master-slave relationship.

In example embodiments, the terms "update" used herein refers to an update of data associated with an operation of each module, and update data may be at least one of firmware of a module, an operating system (OS) of a module and data for operating a module.

The module system 200 may include a master module 210, and at least one sub-module, for example, sub-modules 220, 230, 240, 250, 260 and 270 connected to a network to perform a data communication with the master module 210.

The master module 210 may be communicably connected to an external device 100, for example, a computer or a mobile device. The computer may include, for example, a laptop computer, a desktop computer or a workstation, and the mobile device may include, for example, a mobile phone, a personal digital assistant (PDA), a smartphone, or a tab book. The master module 210 may be communicably connected to the external device 100, to transmit and receive data to and from the external device 100 or to receive update data for the sub-modules 220 through 270. The master module 210 may perform a communication 150 with the external device 100 using one of a universal serial bus (USB) scheme, an infrared data association (IrDA) scheme, a wireless fidelity (Wi-Fi) scheme, a ultra-wideband (UWB) scheme, a Bluetooth scheme, a ZigBee scheme, a code division multiple access (CDMA) scheme, a wideband CDMA (WCDMA) scheme, a long term evolution (LTE) scheme, and an LTE-advanced (LTE-A) scheme. In other words, the master module 210 may be connected to the external device 100 via a wire using a USB. Also, the master module 210 may be wirelessly connected directly to the external device 100 using Wi-Fi, or may be wirelessly connected to the external device 100 using an access point (AP).

The sub-modules 220 through 270 may be connected to a network to perform a data communication with the master module 210, and may each include a micro controller unit (MCU) as a central processing unit (CPU) of which firmware is to be updated. The MCU may include a bootloader area for booting the MCU, and a user code area in which firmware is stored in an inner memory, for example, a flash memory. In the following description, the sub-modules 220 through 270 may also be referred to as a sub-communication module 220, a power source module 230, a motor module 240, a button module 250, a sensor module 260, and a display module 270, respectively. The module system 200 may also include a camera module as a sub-module. The sensor module 260 may be configured to sense various types of physical information, for example, an infrared sensor, a tactile sensor, a touch sensor, an image sensor, a ultrasonic sensor, a fingerprint recognition sensor, an optical sensor, an acoustic sensor, a pressure sensor, a temperature sensor, an acceleration sensor, a gyro sensor, or a voice recognition sensor.

The sub-modules 220 through 270 may be connected via a network bus 202 to transmit and receive data to and from the master module 210. In the example embodiment, the network bus 202 may employ a broadcasting scheme that allows a module corresponding to a destination address of data transmitted through the network bus 202 to receive the data. The network bus 202 may include various wired and wireless communication schemes, for example, a serial communication scheme, a local area network (LAN) scheme, a controller area network (CAN) scheme, a USB scheme, an IrDA scheme, a Wi-Fi scheme, a Bluetooth scheme, a ZigBee scheme, a CDMA scheme, a WCDMA scheme, an LTE scheme, or an LTE-A scheme, and may enable a heterogeneous communication.

In the example embodiment, the network bus 202 may be a CAN bus. When a CAN communication is used, plug-and-play between modules and a broadcasting network may be easily implemented, and a system control speed and a safety may be enhanced with a high reliability.

The master module 210 may transmit, through the network bus 202, update data required for updating to a target sub-module requiring updating of an MCU among the sub-modules 220 through 270.

The power source module 230 is provided to supply power to the entire module system 200. The power source module 230 may be electrically connected to the master module 210 and the other sub-modules, that is, the sub-modules 220, 240, 250, 260 and 270 to supply power required for an operation of a module to the master module 210 and the sub-modules 220, 240, 250, 260 and 270. The power source module 230 may be connected to an external power source to supply power to the module system 200, or may include a lithium (Li)-ion battery to supply power charged in the Li-ion battery.

Each of the modules 210 through 270 may include a block-shaped housing case, and neighboring modules may be physically connected directly to each other or may be connected using a separate connector. Also, the power source module 230 may be separated from the master module 210, or may be formed integrally with the master module 210 in a single housing.

In the external device 100 communicably connected to the module system 200, an integrated development environment (IDE) may be provided to generate an execution code of each of the modules 210 through 270 in the module system 200. The IDE may include a user interface (UI) 110, a module code generator 120, a compiler 130 and a module communicator 140. For example, in the IDE, a user may generate or modify a program for an operation of each of the modules 210 through 270 in the module system 200. The UI 110 may be either a character user interface (CUI) or a graphical user interface (GUI), or may be an interface switchable between the CUI and the GUI. The IDE may support an object-oriented programming development environment, for example, JAVA™, or C++.

The module code generator 120 may divide a program code written in the UI 110 into program codes for each of the modules 210 through 270, may modify the program codes for each of the modules 210 through 270, and may generate an update data code corresponding to each of the modules 210 through 270 using the compiler 130. The generated update data code may be transmitted via the module communicator 140 to the master module 210 of the module system 200 that is connected using a wired or wireless scheme to perform the communication 150.

Figure 2:
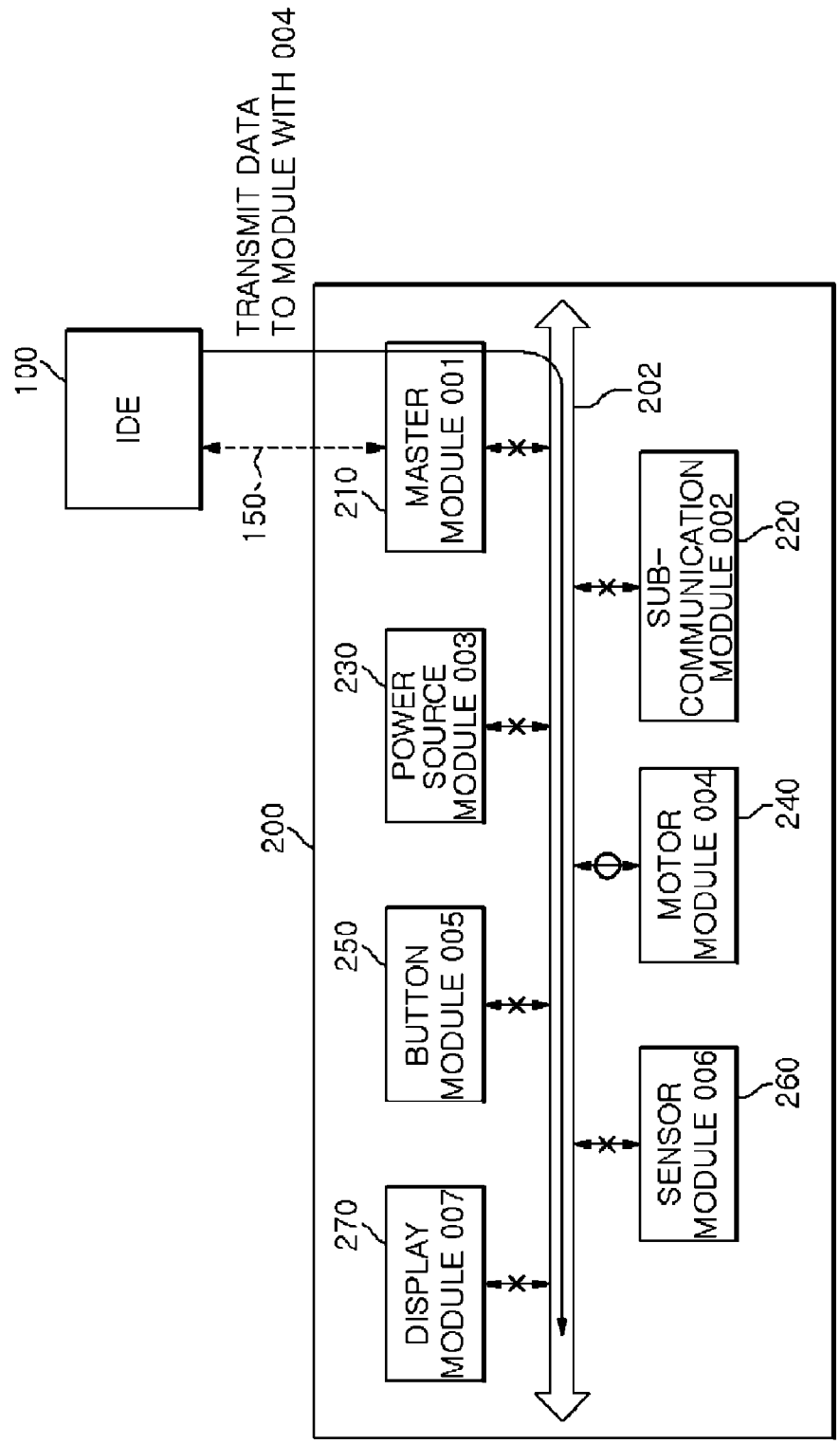
FIG. 2 is a block diagram provided to explain transmission and reception of data between modules in a module system according to an example embodiment.
Figure 3:
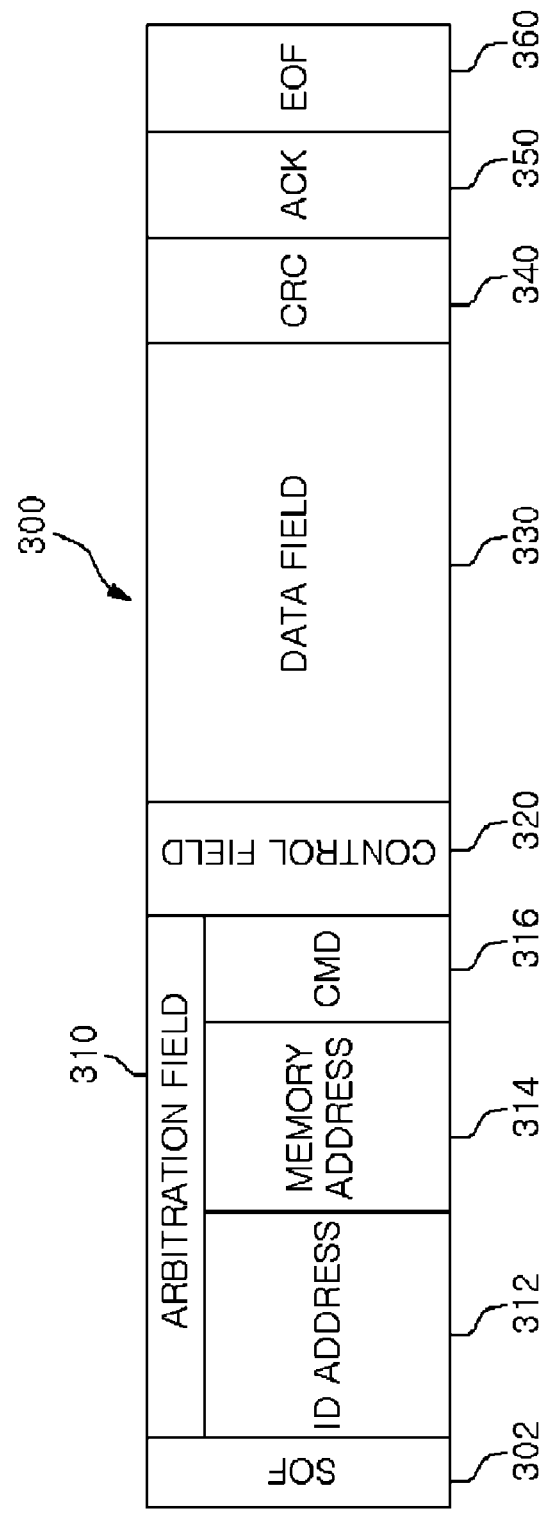
FIG. 3 is a diagram illustrating a data frame transmitted and received between modules in a module system according to an example embodiment.

FIG. 2 is a block diagram provided to explain transmission and reception of data between modules in a module system according to an example embodiment, and FIG. 3 is a diagram illustrating a data frame transmitted and received between modules in a module system according to an example embodiment.

Referring to FIGS. 2 and 3, a module system 200 according to an example embodiment may receive data from an external device 100 using a master module 210. Each of the master module 210 and sub-modules 220, 230, 240, 250, 260 and 270 included in the module system 200 has an address value as a unique identifier. The identifier may be a medium access control (MAC) address, or a unique serial number assigned to each of modules in manufacturing of each of the modules. For example, the master module 210 may have an address value of "001," and the sub-module 220 (hereinafter, also referred to as the sub-communication module 220) may have an address value of "002." Similarly, the sub-modules 230, 240, 250, 260 and 270 may have address values of "003," "004," "005," "006" and "007," respectively. To transmit specific data to the motor module 240 of the master module 210, in the module system 200, the external device 100 may transmit a data packet obtained by adding "004" that is an address value of the motor module 240 to the specific data. The master module 210 of the module system 200 may receive the data packet, may convert the data packet according to a protocol of a network bus 202, and may transmit the converted data packet through the network bus 202 to the sub-modules 220 through 270 connected to the network bus 202. In the example embodiment, the network bus 202 may employ a broadcasting scheme that allows a module corresponding to a destination address of data transmitted through the network bus 202 to receive the data. The network bus 202 may include various wired and wireless communication schemes, for example, a serial communication scheme, a LAN scheme, a CAN scheme, a USB scheme, an IrDA scheme, a Wi-Fi scheme, a Bluetooth scheme, a ZigBee scheme, a CDMA scheme, a WCDMA scheme, an LTE scheme, or an LTE-A scheme, and may enable a heterogeneous communication.

In the example embodiment, the network bus 202 may be a CAN bus. When a CAN communication is used, plug-and-play between modules and a broadcasting network may be easily implemented, and a system control speed and a safety may be enhanced with a high reliability.

Each of the sub-modules 220 through 270 may compare a target address value included in the data packet to an address value of each of the sub-modules 220 through 270, and may determine whether the data packet is transferred to each of the sub-modules 220 through 270. In the example embodiment, because the target address value of the data packet is "004," the motor module 240 may determine that the data packet is transmitted to the motor module 240, and may receive the data packet. On the contrary, the other sub-modules, that is, the sub-modules 220, 230, 250, 260 and 270 may not receive the data packet, because the target address value of the data packet transmitted through the network bus 202 is different from an address value of each of the sub-modules 220, 230, 250, 260 and 270.

FIG. 3 illustrates a structure of a data frame 300 transmitted through the network bus 202. In FIG. 3, the data frame 300 may include a start of frame (SOF) field 302, an arbitration field 310, a control field 320, a data field 330, a cyclic redundancy check (CRC) field 340, an acknowledgement (ACK) field 350, and an end of frame (EOF) field 360. The SOF field 302 may indicate a beginning of a frame, and the EOF field 360 may indicate an end of a frame. Also, the CRC field 340 may be used to check a data frame, and the ACK field 350 may notify a response to reception of data.

The arbitration field 310 may include an identification (ID) address 312 including address information of a module to which the data frame 300 is to be transmitted, a memory address 314 of the module, and a command (CMD) information 316. The CMD information 316 may include information about a beginning or ending of updating of the target module, and information about a command for the target module. The control field 320 may include data length code (DLC) information including a number of bytes of data included in the data field 330. The data field 330 may be a position of useful data transmitted to the target module. Because the data frame 300 includes the ID address 312 for the target module and the data field 330 as shown in FIG. 3, the target module corresponding to the ID address 312 may receive the data field 330.

Figure 4:
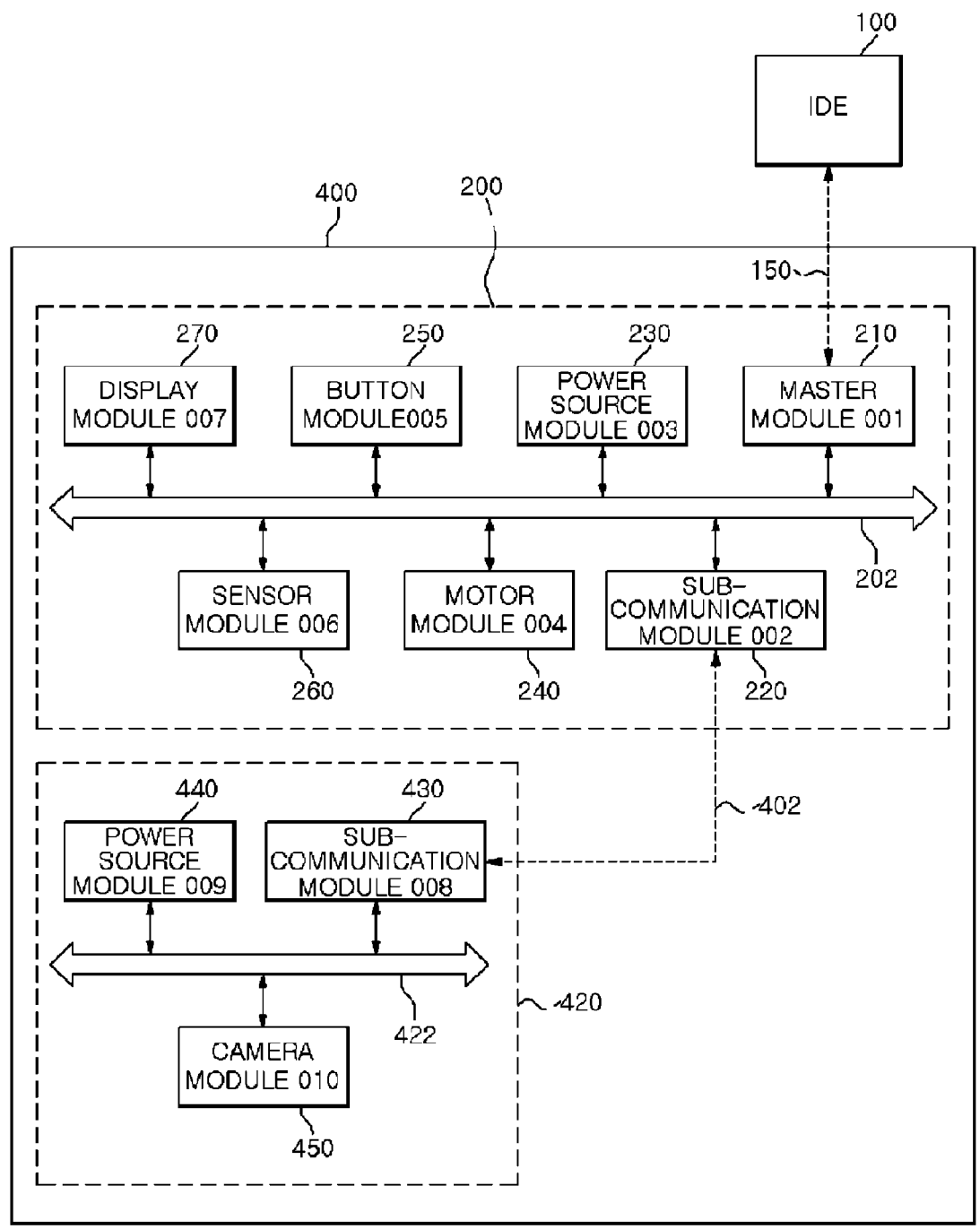
FIG. 4 is a block diagram illustrating a configuration of a module system according to another example embodiment.

FIG. 4 is a block diagram illustrating a configuration of a module system according to another example embodiment.

Referring to FIG. 4, a module system 400 according to another example embodiment may include a first module system 200, and a second module system 420 that is communicably connected to the first module system 200.

The first module system 200 may be the same as the module system 200 of FIG. 1, and may include a master module 210, and sub-modules, that is, a sub-communication module 220, a power source module 230, a motor module 240, a button module 250, a sensor module 260 and a display module 270. The master module 210 may be communicably connected to an external device 100. The master module 210 and the sub-modules 220 through 270 may be connected to a network bus 202 of a broadcasting scheme, for example, a CAN bus.

The second module system 420 may include sub-modules 430, 440 and 450, hereinafter also referred to as a sub-communication module 430, a camera module 450, and a power source module 440. The sub-communication module 430 may be communicably connected to the sub-communication module 220 of the first module system 200 via a wire or wirelessly.

The power source module 440 is provided to supply power to the entire second module system 420. The power source module 440 may be electrically connected to the other sub-modules, that is, the sub-modules 430 and 450 and may supply power required for an operation of each of the sub-modules 430 and 450 to the sub-modules 430 and 450. Each of the sub-modules 430, 440 and 450 may include a block-shaped housing case, and neighboring modules may be physically connected directly to each other, or may be connected using a separate connector. Also, the power source module 440 may be separated from the sub-communication module 430, or may be formed integrally with the sub-communication module 430 in a single housing.

In the same manner as that of the first module system 200, the sub-modules 430, 440 and 450 of the second module system 420 may be connected to a network bus 422 of a broadcasting scheme. Each of the sub-modules 430, 440 and 450 may have an address value as a unique identifier. The identifier may have a MAC address, or may be a unique serial number assigned to each of modules in manufacturing of each of the modules. For example, the sub-communication module 430 may have an address value of "008," the power source module 440 may have an address value of "009," and the camera module 450 may have an address value of "010."

Because the sub-communication module 430 may be communicably connected to the sub-communication module 220 of the first module system 200, the first module system 200 and the second module system 420 may exchange data with each other. For example, the first module system 200 and the second module system 420 may wirelessly exchange data with each other using the sub-communication modules 220 and 430. In this example, even though the first module system 200 and the second module system 420 are physically spaced apart and are disconnected, the first module system 200 and the second module system 420 may share data generated during processing of tasks while performing the tasks independently of each other. Also, the first module system 200 and the second module system 420 may mutually transmit and receive messages, and accordingly it is possible to construct a system enabling organic cooperation. In this example, the network bus 202 of the first module system 200 and the network bus 422 of the second module system 420 may be networks of the same broadcasting scheme, and may be, for example, CAN buses.

Each of the sub-communication module 220 of the first module system 200 and the sub-communication module 430 of the second module system 420 may transmit, receive and store, in advance, address values of modules included in a counterpart module system corresponding to each of the first module system 200 and the second module system 420. For example, the sub-communication module 220 of the first module system 200 may analyze addresses of the modules 430, 440 and 450 included in the second module system 420, and may recognize as if the first module system 200 and the second module system 420 are connected. Similarly, the sub-communication module 430 of the second module system 420 may also analyze addresses of the modules 210 through 270 included in the first module system 200, and may recognize as if the first module system 200 and the second module system 420 are connected.

For example, to transmit specific data (for example, a message) to the camera module 450 of the second module system 420, the external device 100 may transmit a data packet obtained by adding "010" that is the address value of the camera module 450 to the specific data to the master module 210 of the first module system 200. When the data packet is received from the external device 100, the master module 210 may convert the data packet according to a protocol of the network bus 202, and may transmit the converted data packet via the network bus 202 to the sub-modules 220 through 270 connected to the network bus 202. In this example, because an address value of each of the sub-modules 220 through 270 is different from "010" that is a target address value of the data packet, the sub-modules 230, 240, 250, 260 and 270 may not receive the data packet. However, because the sub-communication module 220 knows, in advance, address information including "008," "009" and "010" of the sub-modules 430, 440 and 450 included in the second module system 420, the sub-communication module 220 may recognize that the camera module 450 of the second module system 420 connected to the sub-communication module 220 has the address value of "010." Even though the target module address, that is, "010" of the data packet is different from an address value of "002" of the sub-communication module 220, the sub-communication module 220 may receive the data packet and may transmit the data packet to the sub-communication module 430 of the second module system 420. A communication 402 between the sub-communication modules 220 and 430 may be performed using one of a USB scheme, an IrDA scheme, a Wi-Fi scheme, a UWB scheme, a Bluetooth scheme, a ZigBee scheme, a CDMA scheme, a WCDMA scheme, an LTE scheme, and an LTE-A scheme.

The master module 210 may receive an update data code for the sub-modules 430, 440 and 450 in the second module system 420 from the external device 100 and may store the update data code. The master module 210 may transmit the received update data code to the second module system 420 through the sub-communication modules 220 and 430. Thus, data may be updated for each module in the second module system 420 that is physically separated from the master module 210 of the first module system 200.

Figure 5:
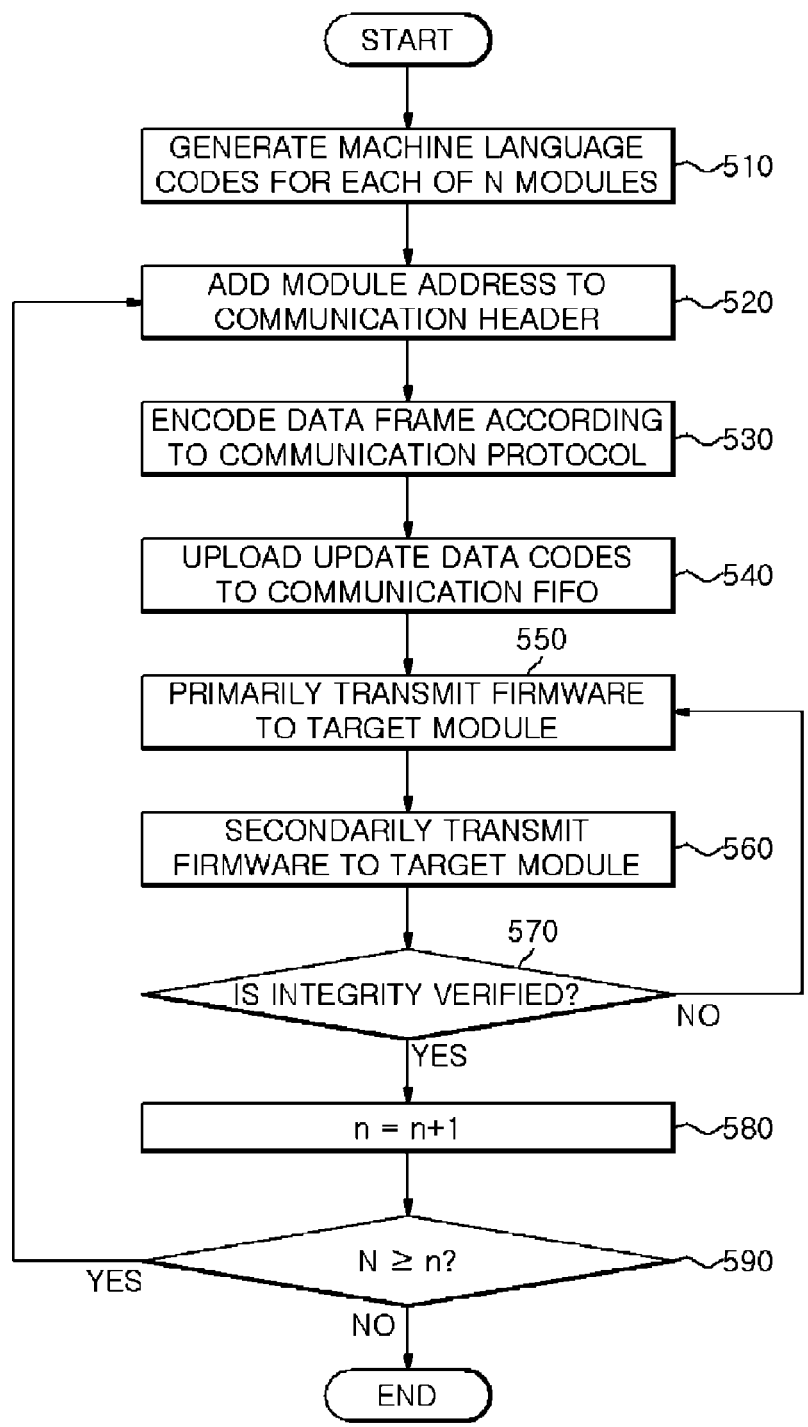
FIG. 5 is a flowchart illustrating operations of a module communicator to perform updating for each of modules in a module system according to an example embodiment.
Figure 6A:
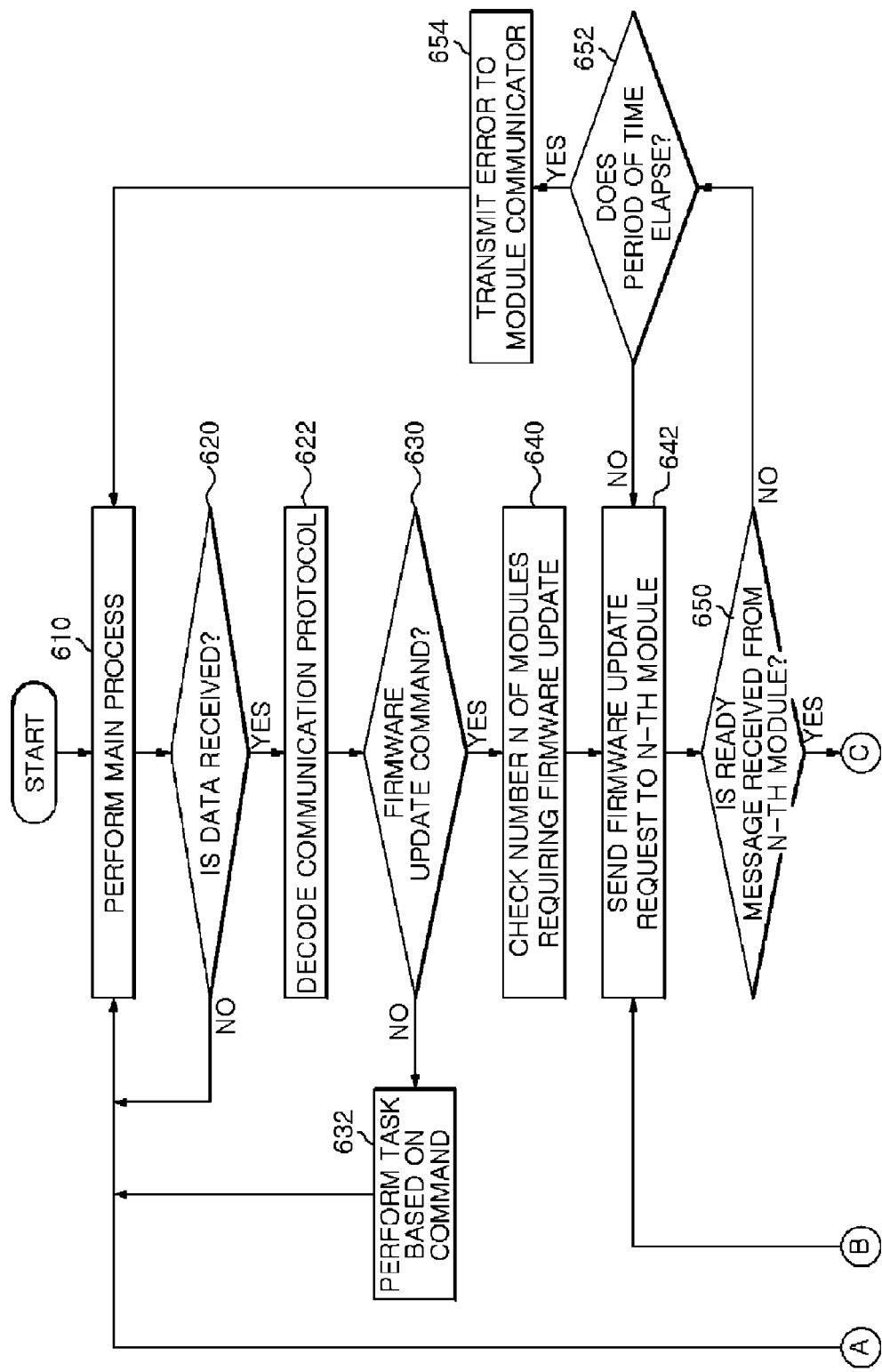
FIG. 6A is a flowchart illustrating operations of a master module to perform updating for each of modules in a module system according to an example embodiment.

FIG. 5 is a flowchart illustrating operations of a module communicator to perform updating for each of modules in a module system according to an example embodiment. FIGS. 6A-6B, taken together, is a flowchart illustrating operations of a master module to perform updating for each of modules in a module system according to an example embodiment.

Figure 7:
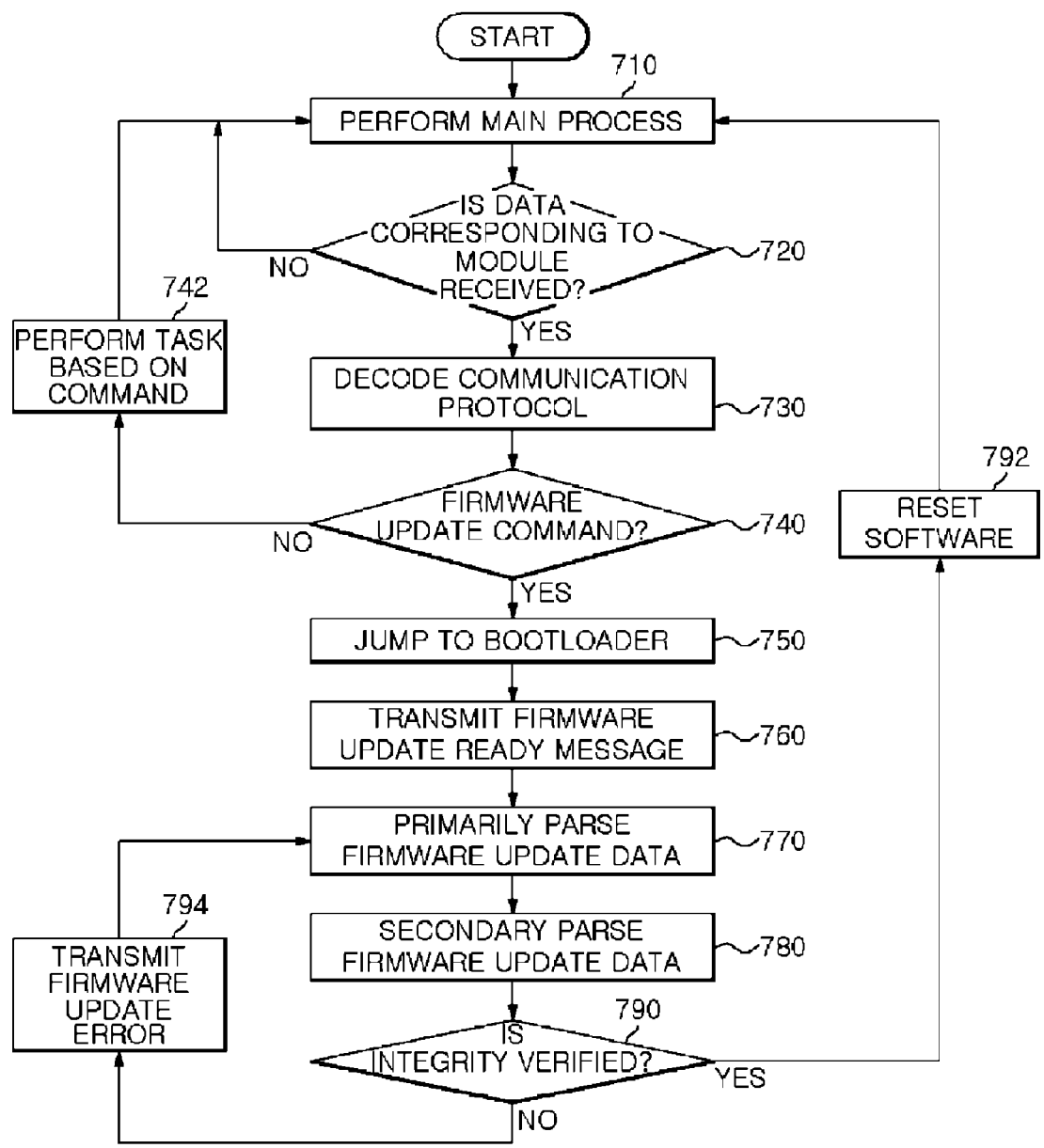
FIG. 7 is a flowchart illustrating operations of a sub-module to perform updating for each of modules in a module system according to an example embodiment.
Figure 8:
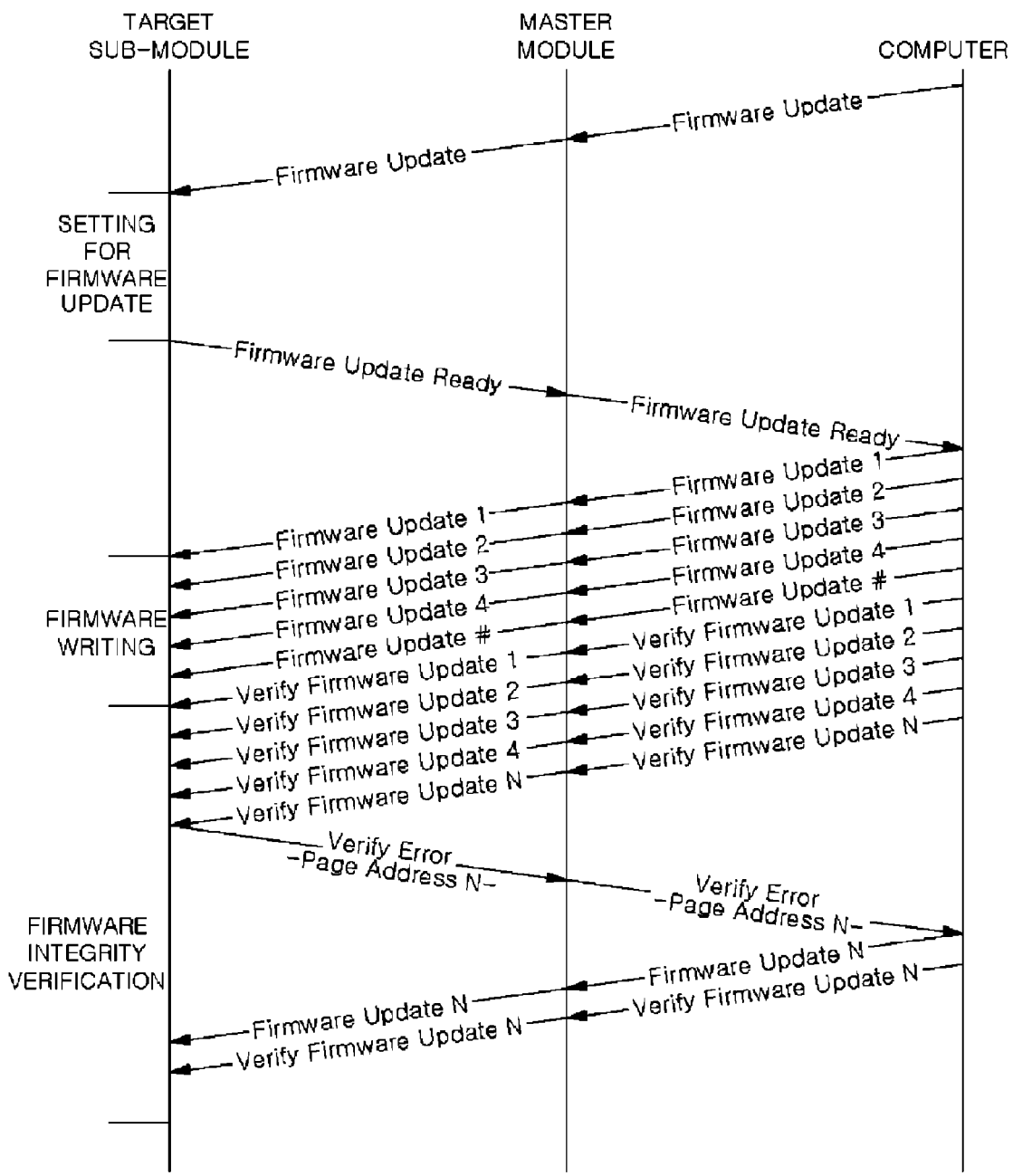
FIG. 8 is a diagram illustrating a flow of messages between a computer, a master module and target sub-modules in a module system according to an example embodiment.

FIG. 7 is a flowchart illustrating operations of a sub-module to perform updating for each of modules in a module system according to an example embodiment. FIG. 8 is a diagram illustrating a flow of messages between a computer, a master module and target sub-modules in a module system according to an example embodiment.

Hereinafter, an updating operation performed by the module communicator will be described with reference to FIGS. 1, 5 and 8. Update data codes generated for each module by the compiler 130 are binary machine language codes. In operation 510, the module communicator 140 receives an update data code of each of N modules from the compiler 130. In operation 520, the module communicator 140 adds a module address of each of the N modules to be updated to a communication header of a data frame including the update data codes. For example, a portion of a unique serial number or a MAC address of a module may be added as a module address to the communication header in operation 520.

In operation 530, the module communicator 140 may encode the data frame according to a communication protocol between the module communicator 140 and the master module 210. For example, each data to be transmitted may be encoded to comply with a wireless communication protocol, for example, Wi-Fi or Bluetooth, or a wired communication protocol, for example, a USB. To transmit update data codes of a plurality of modules, the module communicator 140 may upload the update data codes to a first-in, first out (FIFO) memory in operation 540. In other words, the module communicator 140 may store an encoded update data code for each module in an internal memory using a FIFO scheme, and may transmit the update data code to the master module 210. For example, to transmit the update data codes for each of the N modules, the module communicator 140 primarily transmits, to the master module 210, an update data code for a first module of the module system 200 in operation 550. The update data code for the first module may be a data code first uploaded to the FIFO memory.

The first module may receive the update data code from the master module 210 via the network bus 202. In this example, for integrity verification, the module communicator 140 may retransmit the update data code to the master module 210, and the master module 210 may retransmit the update data code that is received again to the first module in operation 560. The first module may compare the update data codes that are received twice, and may verify integrity in operation 570. In an example, when an error does not occur during operation 570, the first module may generate a completion message and may transmit the completion message to the master module 210. In another example, when an error occurs during operation 570, the first module may generate an error message and may transmit the error message to the master module 210. In this example, the master module 210 may transmit the error message to the module communicator 140, and may request the module communicator 140 to retransmit data of a corresponding portion with the error. The module communicator 140 may retransmit the data of the corresponding portion with the error. The master module 210 may transmit a completion message to the module communicator 140, to notify that updating of the first module is completed without an error.

The module communicator 140 may delete the update data code for the first module from the FIFO memory, and may upload an update data code for a next module in operation 540. Also, the module communicator 140 may transmit an update data code for a second module uploaded second to the FIFO memory to the master module 210 in operation 550. Similarly, for integrity verification, the module communicator 140 may retransmit the update data code for the second module in operation 560. The second module of the module system 200 may compare the update data codes that are received twice, and may verify integrity in operation 570. In an example, when an error does not occur during operation 570, the second module may generate a completion message and may transmit the completion message to the master module 210. In another example, when an error occurs during operation 570, the second module may generate an error message and may transmit the error message to the master module 210. In this example, the master module 210 may transmit the error message to the module communicator 140, and may request the module communicator 140 to retransmit data of a corresponding portion with the error. The module communicator 140 may retransmit the data of the corresponding portion with the error. The master module 210 may transmit a completion message to the module communicator 140, to notify that updating of the second module is completed without an error.

In the same manner as that described above, the module communicator 140 may determine that an update data code for an N-th module does not have an error after transmitting the update data code to the N-th module, and may complete updating for each of the modules in the module system 200.

Hereinafter, an updating operation performed by the master module will be described with reference to FIGS. 1, 6A-6B and 8.

Referring to FIGS. 1, 6A-6B and 8, while performing a specific process based on firmware of the master module 210 of the module system 200 in operation 610, the master module 210 determines whether data is received from the module communicator 140 in operation 620. The master module 210 may receive update data codes for each of modules in the module system 200 from the module communicator 140. For example, when the master module 210 receives data in operation 620, the master module 210 may decode a communication protocol in operation 622, and may interpret content of the received data. The received data may be an update command for a module of the module system 200 in operation 630. For example, when the received data is not the update command in operation 630, the master module 210 may perform a separate task based on a corresponding command in operation 632. When the received data is the update command in operation 630, the master module 210 may check the number N of modules to be updated in operation 640.

In operation 642, the master module 210 may send an update request message for a first module via the network bus 202. The first module may receive the update request message normally and may transmit an update ready message in response to the update request message, and the master module 210 may receive the update ready message normally in operation 650. In response to the update ready message being received, the master module 210 may primarily transmit an update data code for the first module in operation 660. In this example, for integrity verification, the master module 210 may retransmit the update data code to the first module in operation 662. In operation 670, the first module may verify integrity. In an example, when an error does not occur during operation 670, the master module 210 may transmit an update request message to a second module in operation 642, and may update the second module through the same process as that of the first module. In another example, when an error occurs during operation 670, the first module may transmit an error message to the master module 210 in operation 671. In this example, the master module 210 may retransmit the update data code for the first module in operation 660.

When the master module 210 fails to receive the update ready message for the first module in operation 650 and a predetermined period of time elapses in operation 652, the master module 210 may transmit an update error message to the module communicator 140 in operation 654 and may perform an original main process of the master module 210 in operation 610.

Hereinafter, an updating operation performed by a sub-module will be described with reference to FIGS. 1, 7 and 8.

Referring to FIGS. 1, 7 and 8, while performing a specific process based on firmware in operation 710, the sub-modules 220, 230, 240, 250, 260 and 270 of the module system 200 determine whether data is received from the master module 210 in operation 720. Each of the sub-modules 220 through 270 may receive an update data code from the master module 210. For example, when data is received in operation 720, each of the sub-modules 220 through 270 decodes a communication protocol in operation 730, and interprets content of the received data. For example, when the network bus 202 of the module system 200 is a CAN bus, each of the sub-modules 220 through 270 may delete a header associated with the communication protocol from the data received from the master module 210, and may determine whether a CMD, for example, the CMD field 316 of FIG. 3, of the received data corresponds to an update request message. When the received data is determined not to correspond to an update command in operation 740, each of the sub-modules 220 through 270 may perform a separate task based on a corresponding command in operation 742. When the received data is determined to correspond to the update command in operation 740, each of the sub-modules 220 through 270 may stop a process being performed, and may allow a program counter to jump to a bootloader in operation 750.

In operation 760, each of the sub-modules 220 through 270 may transmit an update ready message indicating that each of the sub-modules 220 through 270 is ready for updating to the master module 210. In operation 770, each of the sub-modules 220 through 270 may parse an update data code received from the master module 210 in a user code area. In this example, to verify integrity of the update data code, each of the sub-modules 220 through 270 may receive the update data code again from the master module 210 in operation 780, and may perform a verification process by comparing the parsed update data code to the update data code that is received again in operation 790. In an example, when an error occurs during operation 790, each of the sub-modules 220 through 270 may transmit an error message to the master module 210 in operation 794, and the master module 210 may retransmit an update data code of each of the sub-modules 220 through 270 in operation 770. In another example, when an error does not occur during operation 790, each of the sub-modules 220 through 270 may restart by resetting software of each of the sub-modules 220 through 270 in operation 792.

According to the example embodiments described above, a master module may transmit update data associated with an operation of a sub-module, however, there is no limitation thereto. For example, the master module may also update data associated with an operation of the master module.

As described above, in a module system and an update method for the module system according to an example embodiment, updating for a plurality of modules included in the module system may be performed all at once instead of individually, and thus it is possible to update data for each of the modules simply and efficiently in time update.

Also, various modules included in the module system may be coupled and connected using various schemes, and thus it is possible to construct a module system for diverse purposes. For example, a module system for surveillance may be constructed by combining a power source module, a camera module and a master module, or a mobile module system may be constructed by combining a power source module, a camera module, a master module, and a motor module. In addition, to utilize a module system with the same modules for other uses, updating for the entire module system may be performed all at once without a need to individually develop and update data of each of the modules in the module system.

Thus, it is possible to reuse the modules of the module system, and to easily construct a module system for various purposes by simply changing existing data of the module system.

Module-Based Robot System

Figure 9:
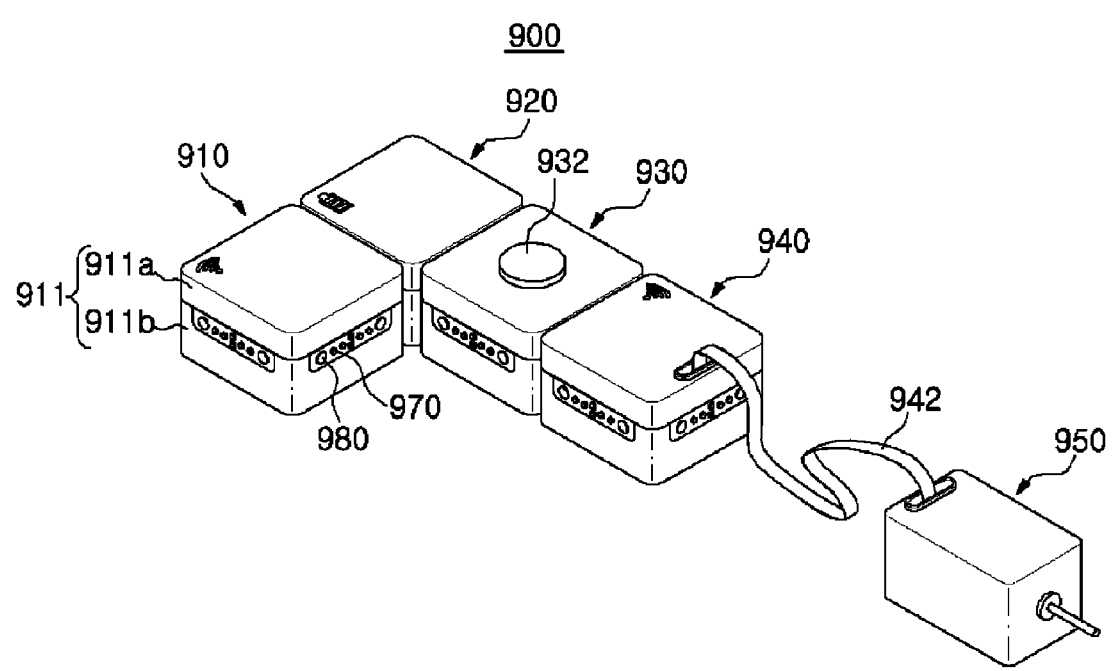
FIG. 9 is a diagram illustrating a configuration of a module-based robot system according to an example embodiment.
Figure 10:
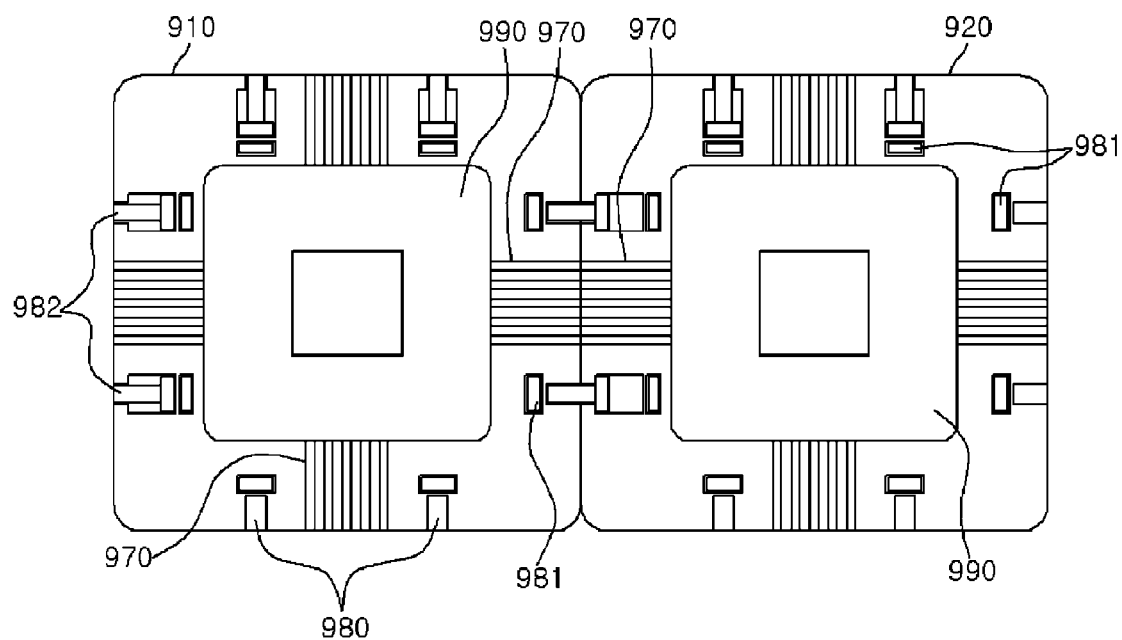
FIG. 10 is a cross-sectional diagram illustrating individual modules of the module-based robot system of FIG. 9.

FIG. 9 is a diagram illustrating a configuration of a module-based robot system according to an example embodiment, and FIG. 10 is a cross-sectional diagram illustrating individual modules of the module-based robot system of FIG. 9.

Referring to FIGS. 9 and 10, a module-based robot system 900 according to an example embodiment is an application of the module system 200 of FIG. 1, and has the same basic configuration as the configuration of the module system 200 of FIG. 1. Accordingly, hereinafter, a feature of the module-based robot system 900 will be described.

The module-based robot system 900 may include a plurality of modules, for example, modules 910, 920, 930, 940 and 950 that may communicate with each other. The module-based robot system 900 may update data of each of the modules 910 through 950.

The module-based robot system 900 may include a master module 910 and at least one sub-module, for example, sub-modules 920, 930, 940 and 950 (hereinafter, also referred to as a power source module 920, a button module 930, a sub-communication module 940, and a motor module 950, respectively) that are connected to a network to perform a data communication with the master module 910. In the example embodiment, the master module 910, the power source module 920, the button module 930, the sub-communication module 940, and the motor module 950 may be communicably connected in sequence, to form the module-based robot system 900. Each of the modules 910, 920, 930, 940 and 950 includes a body case 911b and a cover case 911a that covers the body case 911b in a case 911 with a standardized rectangular parallelepiped shape. The body case 911b includes an MCU 990 to perform a specific function of each of the modules 910 through 950. Each of the modules 910 through 950 may include a coupler 980 for coupling to a neighboring module, a bus pin 970 electrically connected to a neighboring module for a data communication, and a power supply pin 970 for supplying power, in four sides. The master module 910, the power source module 920, the button module 930 and the sub-communication module 940 may be coupled adjacent to each other by couplers 980. In this example, a bus pin 970 and a power supply pin 970 formed in one module may be in contact with a bus pin 970 and a power supply pin 970 formed in another module coupled to the module, respectively. Accordingly, between the coupled modules, power may be supplied and data may be exchanged by forming a network. In the example embodiment, the motor module 950 may be connected to the sub-communication module 940 by a separate connector 942 instead of the coupler 980. The connector 942 may include a power supply line and a data line for transmission and reception of data.

The coupler 980 is provided to connect two neighboring modules to each other. In the example embodiment, the coupler 980 may include a coupling pin 982 disposed in a side of the body case 911b, and a magnet 981 configured to pull the coupling pin 982 using magnetic force. Due to the coupling pin 982 and the magnet 981, two neighboring modules may pull toward each other by magnetic force and may be coupled. In the example embodiment, the coupling pin 982 and the magnet 981 are described as an example of the coupler 980, however, there is no limitation thereto. Accordingly, another type of a coupler may be used. For example, the body case 911b may include a protrusion and a concave portion that accommodates the protrusion, and two neighboring modules may be coupled by inserting a protrusion of one module into a concave portion of the other module.

The master module 910 may be communicably connected to an external device 100, for example, a computer or a mobile device. The computer may include, for example, a laptop computer, a desktop computer or a workstation, and the mobile device may include, for example, a mobile phone, a PDA, a smartphone or a tab book. In the example embodiment, the master module 910 may be connected to the computer or the mobile device for a Wi-Fi communication, to transmit and receive data to and from the external device 100, for example, a computer or a mobile device of a user, or to receive update data for the sub-modules 920 through 950. Also, the master module 910 may be connected to the computer or the mobile device for the communication 150 using one of a USB scheme, an IrDA scheme, a Wi-Fi scheme, a UWB scheme, a Bluetooth scheme, a ZigBee scheme, a CDMA scheme, a WCDMA scheme, an LTE scheme, and an LTE-A scheme.

The sub-modules 920 through 950 may be connected via a network bus 970 to transmit and receive data to and from the master module 910. In the example embodiment, the network bus 970 may employ a broadcasting scheme that allows a module corresponding to a destination address of data transmitted through the network bus 970 to receive the data.

The network bus 970 may include various wired and wireless communication schemes, for example, a serial communication scheme, a LAN scheme, a CAN scheme, a USB scheme, an IrDA scheme, a Wi-Fi scheme, a Bluetooth scheme, a ZigBee scheme, a CDMA scheme, a WCDMA scheme, an LTE scheme, or an LTE-A scheme, and may enable a heterogeneous communication.

In the example embodiment, the network bus 970 may be a CAN bus. When a CAN communication is used, plug-and-play between modules and a broadcasting network may be easily implemented, and a system control speed and a safety may be enhanced with a high reliability.

The master module 910 may transmit data required for updating to a target sub-module requiring updating of an MCU 990 among the sub-modules 920 through 950 through the network bus 970.

As described above, in a module-based robot system according to an example embodiment, updating for a plurality of modules connected to a network may be performed all at once instead of individually, and thus it is possible to update data for each of the modules simply and efficiently in time.

Also, various modules included in a module system may be coupled and connected using various schemes, and thus it is possible to construct a robot system for diverse purposes. For example, a robot system for surveillance may be constructed by combining a power source module, a camera module and a master module, or a mobile robot system may be constructed using a power source module, a camera module, a master module, and a motor module. In addition, to utilize a module-based robot system with the same modules for other uses, updating for the entire robot system may be performed all at once without a need to individually develop and update data of each of the modules in the robot system.

Multi-Module Compilation System

Figure 11:
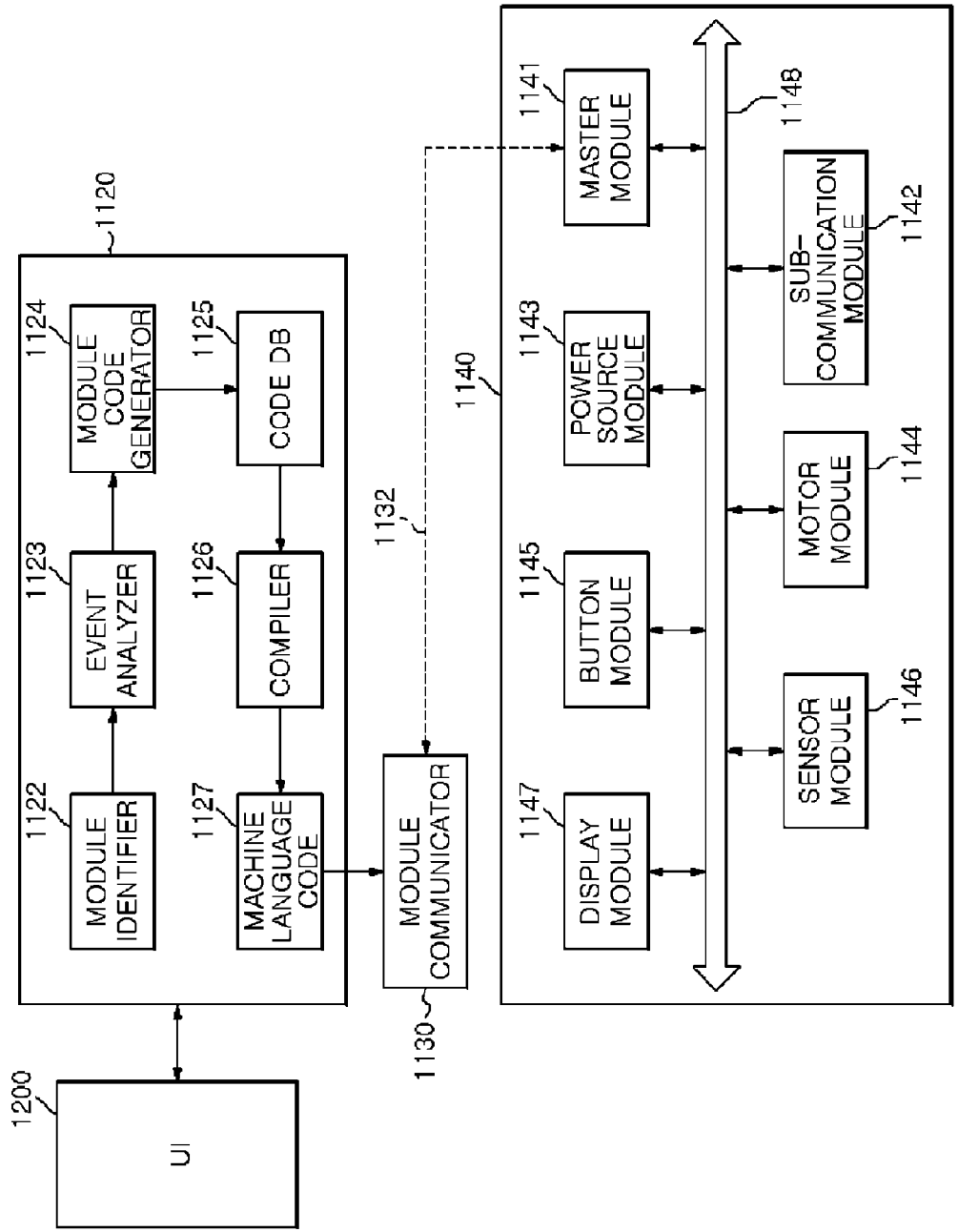
FIG. 11 is a block diagram illustrating a configuration of a multi-module compilation system according to an example embodiment.

FIG. 11 is a block diagram illustrating a configuration of a multi-module compilation system according to an example embodiment.

Referring to FIG. 11, a multi-module compilation system 1120 according to an example embodiment is provided to generate execution codes for each of a plurality of modules, for example, modules 1141, 1142, 1143, 1144, 1145, 1146 and 1147, included in a module system 1140. In the example embodiment, the modules 1141 through 1147 may be connected to each other over a network.

The multi-module compilation system 1120 may be mounted in a computer or a mobile device. The computer may include, for example, a laptop computer, a desktop computer or a workstation, and the mobile device may include, for example, a mobile phone, a PDA, a smartphone or a tab book.

The module system 1140 may update each of the modules 1141 through 1147 that may communicate with each other. The module system 1140 has the same configuration as the configuration of the module system 200 of FIG. 1.

The module system 1140 may include a master module 1141, and at least one sub-module, for example, sub-modules 1142 through 1147 connected over a network to perform a data communication with the master module 1141.

The master module 1141 may be communicably connected to an external device, for example, a computer or a mobile device. The computer may include, for example, a laptop computer, a desktop computer or a workstation, and the mobile device may include, for example, a mobile phone, a PDA, a smartphone or a tab book. More specifically, the master module 1141 may be communicably connected to a module communicator 1130 of the computer or the mobile device. Accordingly, the master module 1141 may transmit and receive data to and from an external device, for example, a computer or a mobile device of a user, or may receive update data for the sub-modules 1142 through 1147. The master module 1141 may perform a communication 1132 with the computer or the mobile device using one of a USB scheme, an IrDA scheme, a Wi-Fi scheme, a UWB scheme, a Bluetooth scheme, a ZigBee scheme, a CDMA scheme, a WCDMA scheme, an LTE scheme, and an LTE-A scheme. In other words, the master module 1141 may be connected to the module communicator 1130 via a wire using a USB. Also, the master module 1141 may be wirelessly connected directly to the module communicator 1130 using Wi-Fi, or may be wirelessly connected to the module communicator 1130 using an AP.

The sub-modules 1142 through 1147 may be connected to a network to perform a data communication with the master module 1141, and may each include an MCU as a CPU capable of being updated. The MCU may include a bootloader area for booting the MCU and a user code area in which firmware is stored in an inner memory, for example, a flash memory. In the example embodiment, the sub-modules 1142 through 1147 may also be referred to as a sub-communication module 1142, a power source module 1143, a motor module 1144, a button module 1145, a sensor module 1146, and a display module 1147, respectively. The module system 1140 may also include a camera module as a sub-module.

The sub-modules 1142 through 1147 may be connected via a network bus 1148 to transmit and receive data to and from the master module 1141. In the example embodiment, the network bus 1148 may employ a broadcasting scheme that allows a module corresponding to a destination address of data transmitted through the network bus 1148 to receive the data. The network bus 1148 may include various wired and wireless communication schemes, for example, a serial communication scheme, a LAN scheme, a CAN scheme, a USB scheme, an IrDA scheme, a Wi-Fi scheme, a Bluetooth scheme, a ZigBee scheme, a CDMA scheme, a WCDMA scheme, an LTE scheme, or an LTE-A scheme, and may enable a heterogeneous communication.

In the example embodiment, the network bus 1148 may be a CAN bus. When a CAN communication is used, plug-and-play between modules and a broadcasting network may be easily implemented, and a system control speed and a safety may be enhanced with a high reliability.

The master module 1141 may transmit update data required for updating to a target sub-module requiring updating of a CPU among the sub-modules 1142 through 1147 through the network bus 1148.

The power source module 1143 is provided to supply power to the entire module system 1140. The power source module 1143 may be electrically connected to the master module 1141 and the other sub-modules, that is, the sub-modules 1142, 1144, 1145, 1146 and 1147 to supply power required for an operation of a module to the master module 1141 and the sub-modules 1142, 1144, 1145, 1146 and 1147. Each of the modules 1141 through 1147 may include a block-shaped housing case, and neighboring modules may be physically connected directly to each other or may be connected using a separate connector. Also, the power source module 1143 may be separated from the master module 1141, or may be formed integrally with the master module 1141 in a single housing.

The multi-module compilation system 1120 may include a module identifier 1122, an event analyzer 1123, a module code generator 1124 and a compiler 1126. The module identifier 1122 may identify a target module that executes a program code to operate the module system 1140. At least a portion of the program code may be written in an object-oriented programming language, for example, C++, C#, or JAVA™. For example, when an entire program code is associated with the motor module 1144 and the button module 1145 of the module system 1140, the module identifier 1122 may analyze the entire program code, and may recognize the motor module 1144 and the button module 1145 as target modules of a program.

The event analyzer 1123 may analyze a program code for the entire module system 1140 and may analyze various events occurring in the target modules 1144 and 1145.

The various events may include a communication data packet transmitted between modules of the module system 1140, an operation command transmitted from one module to another module, or transmission and reception of a message and general data. Also, the events may include a change in an operation, for example, a change in a specific condition in an operation of a module regardless of another module. For example, when the entire program code is associated with an operation of the motor module 1144 based on an on/off operation of the button module 1145, the event analyzer 1123 may recognize an occurrence of an event between the motor module 1144 and the button module 1145 in the entire program code.

The module code generator 1124 may analyze a correlation between a target module recognized by the module identifier 1122 and an event analyzed by the event analyzer 1123, may divide the entire program code into module codes for each of target modules, and may generate the module codes. For example, when the module system 1140 includes four modules, that is, the master module 1141, the motor module 1144, the power source module 1143 and the display module 1147, a user may develop a program code for the entire module system 1140 operating in interconnection with the four modules. The module code generator 1124 may analyze the entire program code developed by the user, and may divide the entire program code into a first module code for an operation of the master module 1141, a second module code for an operation of the motor module 1144, a third module code for an operation of the power source module 1143 and a fourth module code for an operation of the display module 1147, and may generate module codes. In the example embodiment, the event analyzer 1123 and the module code generator 1124 are separated from each other, however, there is no limitation thereto. For example, the module code generator 1124 may include the event analyzer 1123. In this example, the module code generator 1124 may divide the entire program code into module codes for each of the target modules 1144 and 1145 based on a correlation between the target modules 1144 and 1145 and events occurring in the target modules 1144 and 1145, and may generate the module codes.

The compiler 1126 may compile the module codes generated by the module code generator 1124, and may generate a machine language code 1127 as an execution code for each of the target modules. The compiler 1126 may compile a high-level language, for example, C++, C#, or JAVA™, and may generate the machine language code 1127 that is a binary code suitable for an MCU of the target module. The generated machine language code 1127 may be transmitted to the master module 1141 of the module system 1140 through the module communicator 1130 as a communicator.

The multi-module compilation system 1120 may include a code database (DB) 1125 configured to store the program code or the module codes generated by the module code generator 1124. Accordingly, a user may reuse or reference module codes for each module generated in advance for programming development.

The multi-module compilation system 1120 may provide an application programming interface (API) that may be used by a user to write the program code.

For example, the multi-module compilation system 1120 may include a UI 1200 that provides a UI allowing a user to generate and edit the entire program code for the module system 1140. The UI 1200 may include a display configured to receive an input of a user through a mouse or a keyboard connected to a computer and to display corresponding content. The UI 1200 may be used interchangeably with, for example, a CUI or a GUI. Thus, a user may write a program code using a keyboard personally, or may write a program code by selecting a graphic image and selecting a pre-generated standard code. Also, the user may connect, change or edit object images of a program target module on the display, to generate a new program code.

In addition, the multi-module compilation system 1120 may further include a module recognizer (not shown) configured to automatically recognize a type and a number of modules included in the module system 1140 when the multi-module compilation system 1120 is communicably connected to the module system 1140 via the module communicator 1130.

Figure 12B:
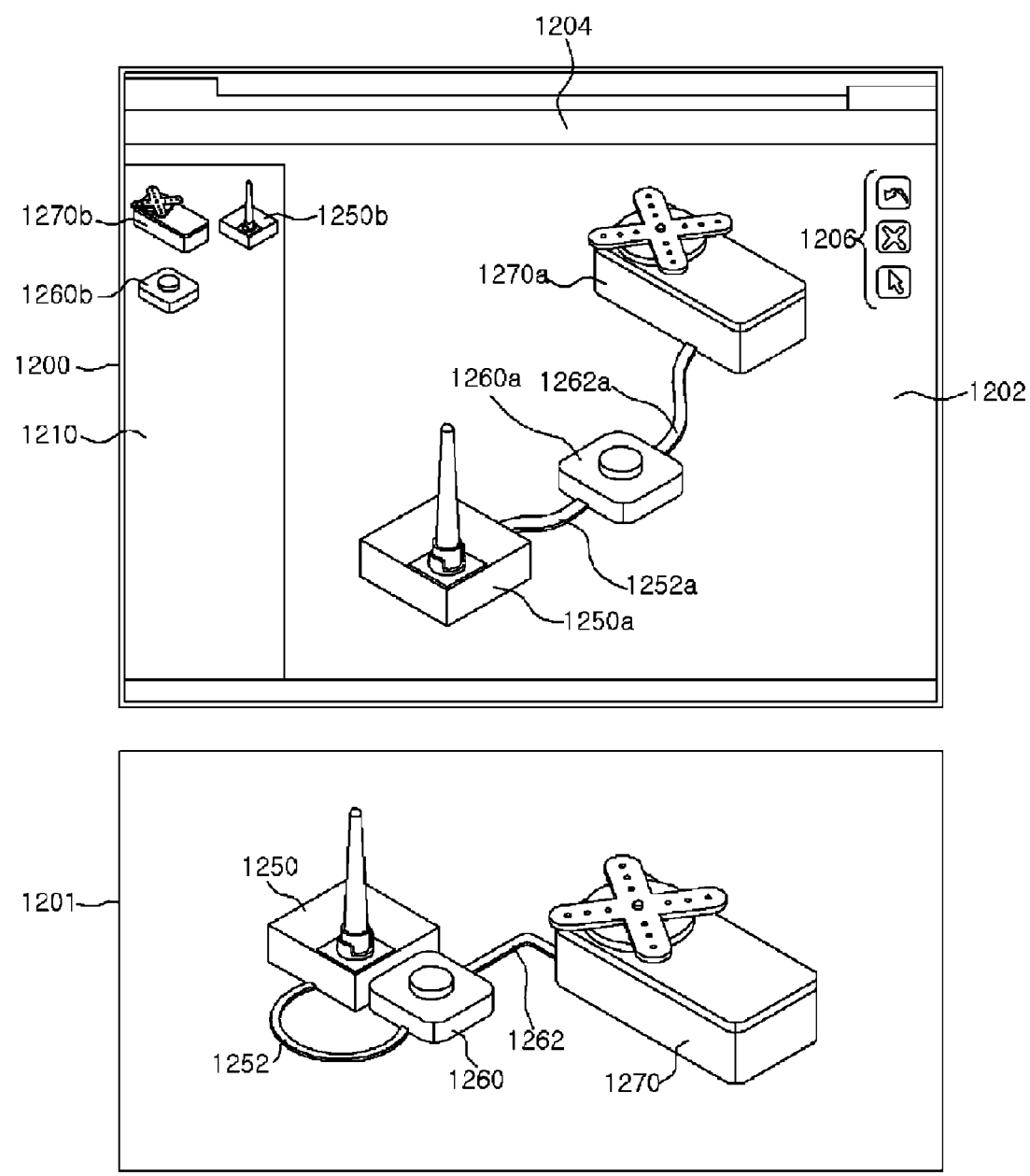
FIG. 12B is a diagram provided to explain a graphical user interface (GUI) in a multi-module compilation system according to an example embodiment.

FIGS. 12A and 12B are diagrams provided to explain a GUI in a multi-module compilation system according to an example embodiment.

Referring to FIGS. 11, 12A and 12B, a GUI 1200 according to an example embodiment may display modules 1250, 1260 and 1270 included in a module system on a display device using computer graphics. Also, the GUI 1200 may receive a user input using a mouse, a keyboard or a touch by a user's finger, and may connect or recombine modules, to generate the entire program code for the module system 1140.

The GUI 1200 may include a main window 1202, a module selection window 1210, and a menu window 1204. The main window 1202 may be used to select and edit modules of a module system and to set a function of each of the modules. The module selection window 1210 may display various types of modules of a module system as icons, and the menu window 1204 may display various menus associated with generation, storage or editing of a program code file. Also, edit icons 1206 may be displayed on the main window 1202 and may be used to select or delete a module or to return to a previous edit state. For example, when a user desires to perform programming by adding a new module, the user may select a new module from the module selection window 1210, and a class variable for the new module may be declared in a program code. Also, when a module is selected from the main window 1202, an action list of actions that may be performed by each module may be displayed. In this example, the displayed action list may be basically provided as a standard list, and a user may update the action list by adding an action item for each module, or may directly perform programming by switching to a CUI environment even though an action item is not provided in the action list.

In the example embodiment, the button module 1260 and the motor module 1270 may be connected to each other in a real world 1201, and accordingly a list of actions associated with a button click may be displayed as an action list of the button module 1260 on the main window 1202. When a user selects the button click, a button click event handler to set content about an event that is to occur when a button of the button module 1260 is clicked may be generated in a button class of the program code. Also, in the button click event handler, content about an operation of the module system to be performed in response to the button click may be programmed. For example, to perform programming to rotate a motor of the motor module 1270 between 0 degrees and 180 degrees in response to the button of the button module 1260 being clicked, a user may write a program for transmission a target rotation angle to the motor module 1270 in the button click event handler generated in the button class. In view of the motor module 1270, a program for 180 degree rotation of the motor of the motor module 1270 when an event in which the motor module 1270 receives information about the target rotation angle from the button module 1260 occurs, may be written in a motor event handler in a class associated with the motor module 1270.

For example, when the module system 1140 is connected to the UI 1200 through the module communicator 1130, the module recognizer (not shown) may automatically recognize the type and the number of the modules included in the module system 1140. In this example, when the module system includes the master module 1250, the button module 1260 and the motor module 1270 that are not yet connected to a network in the real world 1201 as shown in FIG. 12A, the module recognizer may recognize only the master module 1250 that is communicably connected to the module communicator 1130. Accordingly, the master module 1250 may be displayed on the main window 1202. In another example, when the module system includes the master module 1250, the button module 1260 and the motor module 1270 that are connected via network connectors 1252 and 1262 in the real world 1201 as shown in FIG. 12B, the module recognizer may recognize the master module 1250 that is communicably connected to the module communicator 1130, and may also recognize the button module 1260 and the motor module 1270 that are connected over a network to the master module 1250. In addition, connection structures of the modules 1250, 1260 and 1270 in the module system may be recognized. Accordingly, all of the master module 1250, the button module 1260 and the motor module 1270 may be displayed on the main window 1202, and virtual network connection lines 1252*a* and 1262*a* indicating the connection structures of the modules 1250, 1260 and 1270 may also be displayed. In the program code, class variables of the recognized modules 1250, 1260 and 1270 may automatically be declared similarly to a plug-and-play scheme.

When the module system 1140 is communicably connected to the module communicator 1130, the module recognizer may receive an execution code stored in each of the modules 1250, 1260 and 1270 of the module system, and may transmit the execution code to the UI 1200. Thus, a user may review and modify an execution code stored currently in each of the modules 1250, 1260 and 1270 of the module system.

Multi-Module Compilation Method

Hereinafter, a multi-module compilation method according to an example embodiment will be described.

Figure 13:
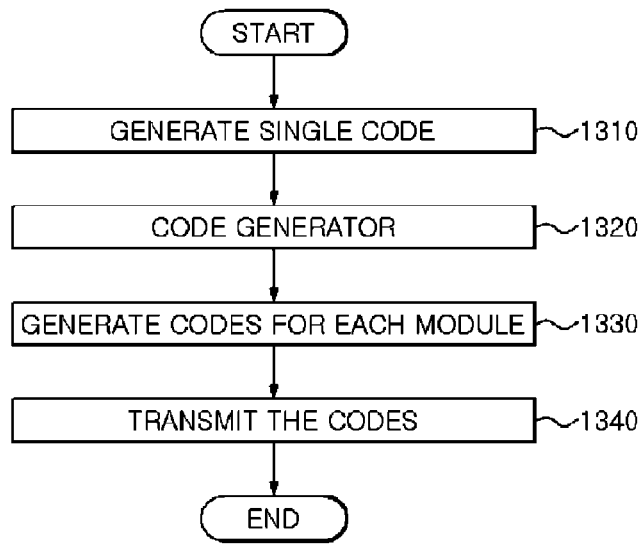
FIG. 13 is a flowchart illustrating operations of a multi-module compilation method according to an example embodiment.
Figure 14:
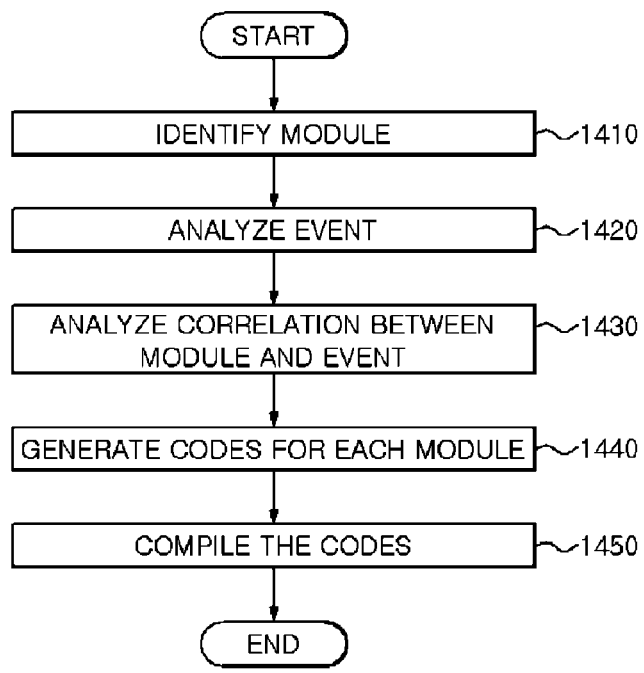
FIG. 14 is a flowchart illustrating operations performed by a code generator (for example, a module code generator) in the multi-module compilation method of FIG. 13.

FIG. 13 is a flowchart illustrating operations of a multi-module compilation method according to an example embodiment, and FIG. 14 is a flowchart illustrating operations performed by a code generator (for example, a module code generator) in the multi-module compilation method of FIG. 13.

The operations of the multi-module compilation method will be described with reference to FIGS. 11 and 13. In operation 1310, a user generates a program code to operate an entire module system in an external device, for example, a computer or a mobile device. The module system 1140 includes a plurality of modules connected to a network. In this example, the user may call a program code that is written and stored in advance in the code DB 1125, and may reuse or edit the program code to write a new program code. In operation 1330, a code generator 1320 generates program codes for each of modules of the module system 1140 by analyzing and reconstructing a program code for the entire module system 1140. In operation 1340, the generated program codes are transmitted to the module system 1140, and the module system 1140 updates a new program code to each of the modules.

Operations performed by the code generator 1320 of FIG. 13 will be further described with reference to FIGS. 11 and 14. In operation 1410, the code generator 1320 (for example, a module code generator) analyzes a program code for the entire module system 1140 written by a user, and identifies a target module that executes the program code. In operation 1420, the code generator 1320 analyzes a type and a number of events occurring in the target module by analyzing the program code for the entire module system 1140. For example, in operation 1420, the code generator 1320 may analyze an event based on a type of target modules and messages transmitted and received between the target modules.

In operation 1430, the code generator 1320 analyzes a correlation between the event and each of the target modules. In operation 1440, the code generator 1320 generates codes for each of the target modules by dividing and reconstructing the program code. In operation 1450, the code generator 1320 compiles the codes and generates execution codes for each of the modules. The execution codes may be binary machine language codes, and may be executed in the target modules.

The multi-module compilation method may further include automatically recognizing a type and a number of modules included in a module system when the module system is communicably connected to a computer or a mobile device, and displaying the recognized type and the recognized number of the modules on the computer or the mobile device.

Figure 15:
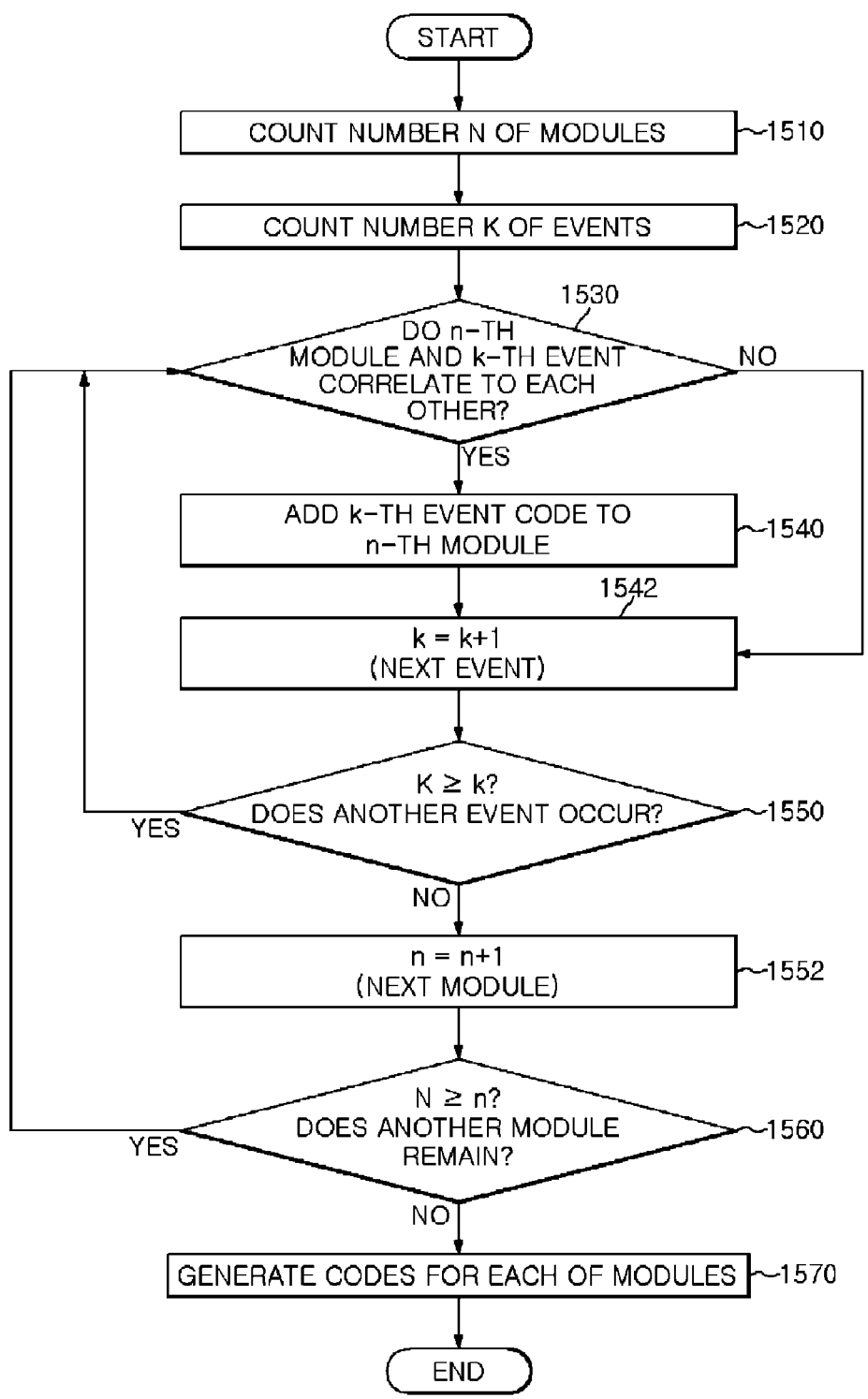
FIG. 15 is a flowchart illustrating an example of an event analyzing operation of FIG. 14.

FIG. 15 is a flowchart illustrating an example of operation 1420 of FIG. 14.

An event analyzing operation performed by a code generator will be further described with reference to FIGS. 11 and 15. In the example embodiment, for convenience of understanding, a module system including three modules in total, for example, a master module as a first module, a motor module as a second module, and a button module as a third module will be described. For example, when a button of the button module is clicked, a user may perform programming for 180 degree rotation of a motor of the motor module as a first event in a GUI or CUI environment. In this example, the code generator analyzes a program code for the entire module system, counts the number N of modules used in the program code in operation 1510, and counts the number K of events in operation 1520. For convenience of understanding, in the example embodiment, a single event, that is, the first event as an event occurring in a module will be described.

In operation 1530, the code generator determines a correlation between an n-th module and a k-th event in an order of the first module to an N-th module and in an order of the first event to a K-th event. In the example embodiment, whether the first event and the master module as the first module correlate to each other is determined first. When it is determined that the first event and the master module do not correlate to each other, whether the first event and the button module as the second module correlate to each other is determined. When the first event and the button module are determined to correlate to each other, the code generator analyzes a code block related to the button module and the first event in the program code, and generates a related program code in a program module portion corresponding to the button module in operation 1540.

The code generator proceeds to a next event in operation 1542, and determines whether the next event and the button module correlate to each other in operation 1530. When it is determined that an additional related event does not occur in operation 1550, the code generator proceeds to a next module, that is, the third module in operation 1552, and determines whether the first event and the motor module as the third module correlate to each other in operation 1530. When the first event and the motor module are determined to correlate to each other, the code generator analyzes a code block related to the motor module and the first event in the program code, and generates a related program code in a program module portion corresponding to the motor module in operation 1540.

In operation 1570, the code generator generates program codes for each of the N modules by analyzing a correlation between each of the N modules and each of the K events in the program code in the same scheme as that described above. In the example embodiment, because the master module as the first module does not correlate to the first event, a firmware program stored in advance in the first module remains unchanged. Thus, during updating for each module, the first module does not need to update the firmware program. On the contrary, because the second module and the third module correlate to the first event, a portion of a firmware program of each of the second module and the third module may change in comparison to a firmware program stored in advance in each of the second module and the third module. Thus, during updating for each module, firmware programs of the second module and the third module may be updated.

Example of Multi-Module Program

Figure 16C:
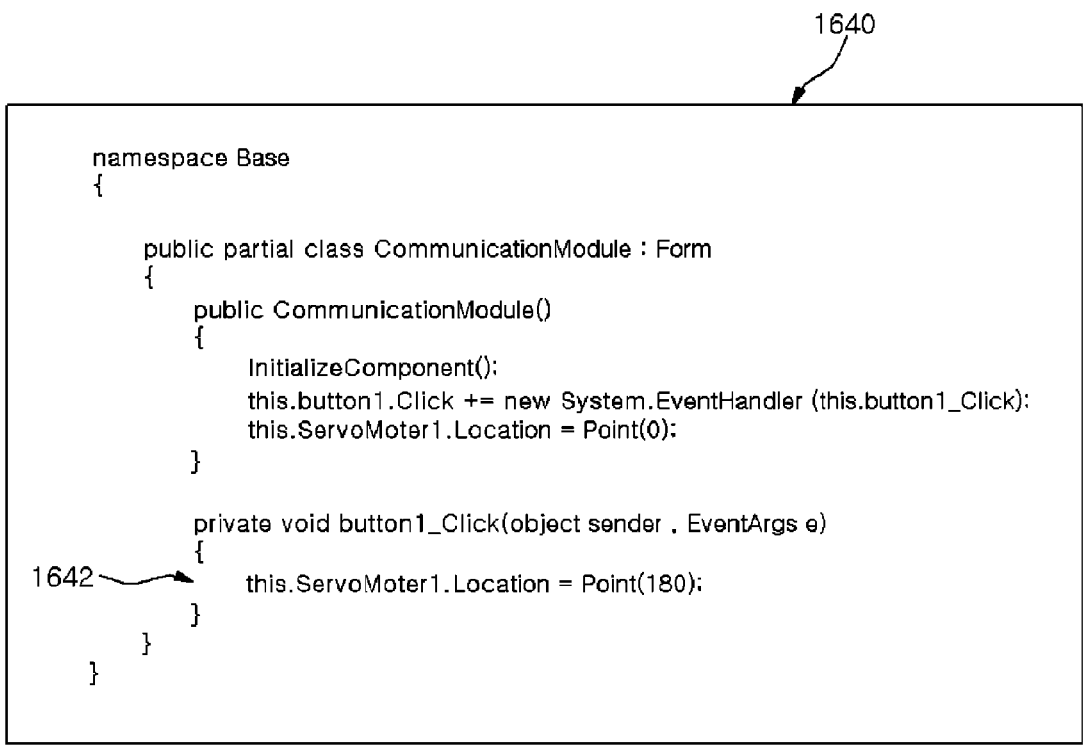
FIG. 16C illustrates a code list showing processing of an event transmitted and received between recognized modules according to an example embodiment.

FIG. 16A illustrates a code list showing a class of a module in a program code compiled in a multi-module compilation system according to an example embodiment, FIG. 16B illustrates a code list showing a class of another module that is additionally recognized, and FIG. 16C illustrates a code list showing processing of an event transmitted and received between recognized modules. FIGS. 17A and 17B illustrate code lists for each module generated using a multi-module compilation system according to an example embodiment.

Referring to FIGS. 12A and 16A, because the master module 1250, the button module 1260 and the motor module 1270 are disconnected from each other, a class 1602 of the master module 1250 communicating with an IDE system may be represented in a program code 1600 for a module system in the IDE system.

When the master module 1250, the button module 1260 and the motor module 1270 are connected as shown in 12B, a class of the button module 1260 and a class of the motor module 1270 may be generated in addition to the class 1602 of the master module 1250 communicating with the IDE system in a program code 1620 for a module system in the IDE system as shown in FIG. 16B. Also, a program code 1622 for an action of the button module 1260, a program code 1624 for an action of the motor module 1270 and a program code 1626 for an event occurring when the button of the button module 1260 is clicked may be generated in the class 1602 of the master module 1250. In other words, a program code defining an available action of each of the sub-modules 1260 and 1270 communicably connected to the master module 1250 may be generated. For example, referring to FIG. 16C, a program code 1642 for rotation of the motor of the motor module 1270 between 0 degrees and 180 degrees when the button of the button module 1260 is clicked may be generated in a program code 1640.

In the example embodiment, the button module 1260 and the motor module 1270 may be connected to each other in a real world 1201, and accordingly a list of actions associated with a button click may be displayed as an action list of the button module 1260 on the main window 1202. When a user selects the button click, a button click event handler to set content about an event that is to occur when a button of the button module 1260 is clicked may be generated in a button class of the program code. Also, in the button click event handler, content about an operation of the module system to be performed in response to the button click may be programmed. For example, to perform programming to rotate a motor of the motor module 1270 between 0 degrees and 180 degrees in response to the button of the button module 1260 being clicked, a user may write a program for transmitting a target rotation angle to the motor module 1270 in the button click event handler generated in the button class. In view of the motor module 1270, a program for 180 degree rotation of the motor of the motor module 1270 when an event in which the motor module 1270 receives information about the target rotation angle from the button module 1260 occurs, may be written in a motor event handler in a class associated with the motor module 1270.

When the program code for the entire module system is completed, a code generator may analyze the program code and a correlation between a target module and an event for the target module, and may divide and reconstruct the program code, to generate a program code 1720 for the button module 1260 shown in FIG. 17A and a program code 1760 for the motor module 1270 shown in FIG. 17B.

Referring to FIG. 17A, the program code 1720 for the button module 1260 may include a module template code 1722 that is basically generated, and an additional code 1724 that is additionally generated by the code generator. The additional code 1724 may include a definition area 1726 indicating definition of a message to be transferred upon an occurrence of a first event, and a message area 1728 indicating the message to be transferred upon an occurrence of the first event. Referring to FIG. 17B, the program code 1760 for the motor module 1270 may include a module template code 1762 that is basically generated, and an additional code 1764 that is additionally generated by the code generator. The additional code 1764 may include an area 1765 indicating an initial position of the motor, an ID reception setting area 1766, an area 1768 indicating a condition in which a message associated with the first event is received, and an operation area 1769 of an operation needing to be performed by the motor module 1270 when the condition is satisfied.

As described above, in a multi-module compilation system and a multi-module compilation method according to an example embodiment, execution codes for each of a plurality of modules included in a module system may be quickly and effectively generated from a program code for the entire module system. Thus, it is possible to simply and efficiently update firmware of each of the modules in the module system by generating codes for each of the modules from the program code and compiling the codes.

In addition, to utilize the module system with the same modules for other uses, updating for the module system may be performed all at once by modifying a program for the entire module system and by generating execution codes for each of the modules through multi-module compiling, without a need to individually redevelop firmware of each of the modules in the module system.

Also, it is possible to reuse modules included in a module system for a variety of purposes.

The example embodiments have been disclosed for illustrative purposes, those skilled in the art will understand that the example embodiments can be carried out in other specific forms without changing the technical idea or essential features of the example embodiments. Thus, it should be understood that the foregoing example embodiments are provided for illustration only and are not to be construed in any way as limiting the disclosure.

The scope of the disclosure is defined by the claims other than the detailed description, and all modifications and variations derived from the meaning and scope of the claims and their equivalents should be interpreted as fall in the scope of the disclosure.

What is claimed is:

1. A module system comprising:
   a plurality of hardware modules;
   a multi-module compilation system for generating execution codes for each of the plurality of hardware modules included in a module system further comprising:
      a module identifier configured to analyze a program code of the module system and to identify one or more target hardware modules that execute the program code;
      a module code generator configured to divide the program code into one or more module codes for each of the target hardware modules based on a correlation between the identified target hardware modules; and
      a compiler configured to compile the module codes including a module template code that is basically generated and
   an additional code that is additionally generated by the code generator to generate execution codes for each of the target hardware modules.

2. The module system of claim 1, wherein the module code generator is configured to divide the program code into the module codes for each of the target hardware modules and to generate the module codes based on a correlation between the target hardware modules and events occurring in the target hardware modules.

3. The module system of claim 1, further comprising:
   a user interface (UI) configured to allow a user to generate and edit the program code of the module system.

4. The module system of claim 3, wherein the UI is a character user interface (CUI) or a graphical user interface (GUI).

5. The module system of claim 1, further comprising:
   a communicator configured to communicate with the module system.

6. The module system of claim 1, wherein the plurality of hardware modules are connected to a network.

7. The module system of claim 1, wherein each of the module codes includes:
   a definition portion of a message to be transferred upon an occurrence of a first event; and
   a message portion including the message to be transferred upon the occurrence of the first event.

8. The module system of claim 1, wherein each of the module codes includes:
   a module setting portion including content for setting one of the plurality of hardware modules and identifier information of one of the plurality of the hardware modules;
   an event transmission and reception portion including content of a message transmitted and received between the hardware modules; and
   an event operation portion including content about operations of the hardware modules related to the message.

9. A method for a module system comprising:
   analyzing a program code of the module system and identifying one or more target hardware modules that execute the program code;
   dividing the program code into one or more module codes for each of the target hardware modules based on a correlation between the identified target hardware modules;
   compiling the module codes including a module template code that is basically generated and
   an additional code that is additionally generated by the code generator to generate execution codes for each of the target hardware modules; and
   transmitting the generated execution codes to each of the target hardware modules.

10. The method of claim 9, wherein the dividing comprises dividing the program code into the module codes for each of the target hardware modules and generating the module codes based on a correlation between the target hardware modules and events occurring in the target hardware modules.

11. The method of claim 9, further comprising:
   automatically recognizing a type and a number of hardware modules included in the module system when the module system is communicably connected to a computer or a mobile device.

12. The method of claim 11, further comprising:
   displaying the recognized type and the recognized number of the hardware modules on the computer or the mobile device.

13. The method of claim 9, wherein each of the module codes includes:
   a definition portion of a message to be transferred upon an occurrence of a first event; and
   a message portion including the message to be transferred upon the occurrence of the first event.

14. The method of claim 9, wherein each of the module codes includes:

a module setting portion including content for setting one of the plurality of hardware modules and identifier information of one of the plurality of the hardware modules;
an event transmission and reception portion including content of a message transmitted and received between the hardware modules; and
an event operation portion including content about operations of the hardware modules related to the message.

15. A non-transitory computer-readable storage medium storing a compiler program for generating execution codes for each of a plurality of hardware modules included in a module system,
the non-transitory computer-readable storage medium being configured to, when the compiler program is executed by a computer or a mobile device, perform a method comprising:
analyzing a program code of the module system and identifying one or more target hardware modules that execute the program code;
dividing the program code into one or more module codes for each of the target hardware modules based on a correlation between the identified target hardware modules; and
compiling the module codes to generate execution codes for each of the target hardware modules.

16. The non-transitory computer-readable storage medium of claim 15, wherein the dividing comprises dividing the program code into the module codes for each of the target hardware modules and generating the module codes based on a correlation between the target hardware modules and events occurring in the target hardware modules.

17. The non-transitory computer-readable storage medium of claim 15, wherein the method further comprises:
providing a user interface (UI) configured to allow a user to generate and edit the program code of the module system,
wherein the UI is a character user interface (CUI) or a graphical user interface (GUI).

* * * * *